(12) United States Patent
Palmer et al.

(10) Patent No.: US 12,399,151 B2
(45) Date of Patent: Aug. 26, 2025

(54) METHOD OF SELECTING IONS BY ION MOBILITY SEPARATION AND ISOLATION OF IONS

(71) Applicant: Micromass UK Limited, Wilmslow (GB)

(72) Inventors: Martin Palmer, Altrincham (GB); Eleanor Riches, Northwich (GB); Jakub Ujma, Manchester (GB); Jason Lee Wildgoose, Stockport (GB); Martin Raymond Green, Bowdon (GB); David J. Langridge, Macclesfield (GB); Kevin Giles, Stockport (GB); Steven Derek Pringle, Darwen (GB); Daniel James Kenny, Knutsford (GB)

(73) Assignee: Micromass UK Limited, Wilmslow (GB)

( * ) Notice: Subject to any disclaimer, the term of this patent is extended or adjusted under 35 U.S.C. 154(b) by 504 days.

(21) Appl. No.: 17/599,312

(22) PCT Filed: Mar. 27, 2020

(86) PCT No.: PCT/GB2020/050839
§ 371 (c)(1),
(2) Date: Sep. 28, 2021

(87) PCT Pub. No.: WO2020/201732
PCT Pub. Date: Oct. 8, 2020

(65) Prior Publication Data
US 2022/0163480 A1 May 26, 2022

(30) Foreign Application Priority Data
Mar. 29, 2019 (GB) .................................... 1904425

(51) Int. Cl.
*G01N 27/622* (2021.01)
*H01J 49/00* (2006.01)
*H01J 49/40* (2006.01)

(52) U.S. Cl.
CPC .......... *G01N 27/622* (2013.01); *H01J 49/004* (2013.01); *H01J 49/408* (2013.01)

(58) Field of Classification Search
CPC .......... H01J 49/00; H01J 49/02; H01J 49/004; H01J 49/408; H01J 49/0081;
(Continued)

(56) References Cited

U.S. PATENT DOCUMENTS 9,147,565 B1 * 9/2015 Goedecke ............ G01N 27/622
9,984,861 B2 5/2018 Giles et al.
(Continued)

FOREIGN PATENT DOCUMENTS

CN 106461609 A 2/2017
CN 106463334 A 2/2017
(Continued)

OTHER PUBLICATIONS

International Search Report and Written Opinion for International Application No. PCT/GB2020/050839, mailed Jun. 22, 2020.
(Continued)

*Primary Examiner* — Jason L McCormack
(74) *Attorney, Agent, or Firm* — Goodwin Procter LLP

(57) ABSTRACT

A method of selecting ions comprises selecting ions corresponding to a target ion of interest by separating analyte ions according to their ion mobility, isolating first ions of the analyte ions, separating the first ions according to their ion mobility, and isolating second ions of the first ions. Preferably, the separation is accomplished by using a cyclic or closed-loop separator.

13 Claims, 20 Drawing Sheets

(58) Field of Classification Search
CPC ...... H01J 49/0031; H01J 49/06; H01J 49/062; H01J 49/063; H01J 49/066; G01N 27/622
USPC .......................................... 250/281, 282, 283
See application file for complete search history.

(56) References Cited

U.S. PATENT DOCUMENTS

| | | | |
|---|---|---|---|
| 2007/0114382 | A1 | 5/2007 | Clemmer et al. |
| 2011/0121171 | A1 | 5/2011 | Clemmer et al. |
| 2011/0291001 | A1* | 12/2011 | Hoyes ................. G01N 27/623 250/288 |
| 2012/0261564 | A1 | 10/2012 | Belov |
| 2012/0286156 | A1 | 11/2012 | Park et al. |
| 2014/0353487 | A1* | 12/2014 | Giles .................. H01J 49/4235 250/282 |
| 2016/0005581 | A1 | 1/2016 | Graichen et al. |
| 2017/0125234 | A1 | 5/2017 | Rather et al. |
| 2017/0213716 | A1* | 7/2017 | Wildgoose ........... G01N 27/622 |

FOREIGN PATENT DOCUMENTS

| | | |
|---|---|---|
| GB | 2499587 A | 8/2013 |
| GB | 2534431 A | 7/2016 |
| GB | 2564749 A | 1/2019 |
| WO | 2007054712 A2 | 5/2007 |
| WO | 2007079234 A2 | 7/2007 |
| WO | 2010020763 A2 | 2/2010 |
| WO | 2013140132 A2 | 9/2013 |
| WO | 2015155551 A1 | 10/2015 |
| WO | 2015185941 A1 | 12/2015 |

OTHER PUBLICATIONS

Search Report for GB Application No. GB1904425.4, mailed Oct. 3, 2019.
Ridgeway, M.E. et al., "Trapped ion mobility spectrometry: A short review", International Journal of Mass Spectrometry, 425: 22-35, (2018).
Combined Search and Examination Report or GB Application No. GB2004464.0, mailed Sep. 22, 2020.
Examination Report or GB Application No. GB2004464.0, mailed Aug. 11, 2021.
Merenbloom, S.I., et al., "High-Resolution Ion Cyclotron Mobility Spectrometry", Anal. Chem., 81(4):1482-1487, Feb. 15, 2009.
Giles, K., et al, "Design and Utility of a Multi-Pass Cyclic Ion Mobility Separator", ASMS 2014 Proceedings, Baltimore, www.waters.com/Posters (2014).
Deng, L., et al., "Serpentine Ultralong Path with Extended Routing (SUPER) High Resolution Traveling Wave Ion Mobility-MS using Structures for Lossless Ion Manipulations", Anal. Chem., 89(8):4628-4634, Apr. 18, 2017.
Deng, L., et al, "Ion Mobility Separations of Isomers based upon Long Path Length Structures for Lossless Ion Manipulations Combined with Mass Spectrometry", Chemistry Select, 1(10):2396-2399, Jul. 1, 2016.
Li, H., et al, "Carbohydrate Structure Characterization by Tandem Ion Mobility Mass Spectrometry (IMMS)2", Analytical Chemistry, 85(5): 2760-2769, Mar. 5, 2013.
Koeniger, S.L., et al, "An IMS-IMS Analogue of MS-MS", Analytical Chemistry, 78(12):4161-4174, Jun. 15, 2006.
Office Action for Chinese Patent Application No. 202080023640.8, mailed May 24, 2024.

* cited by examiner

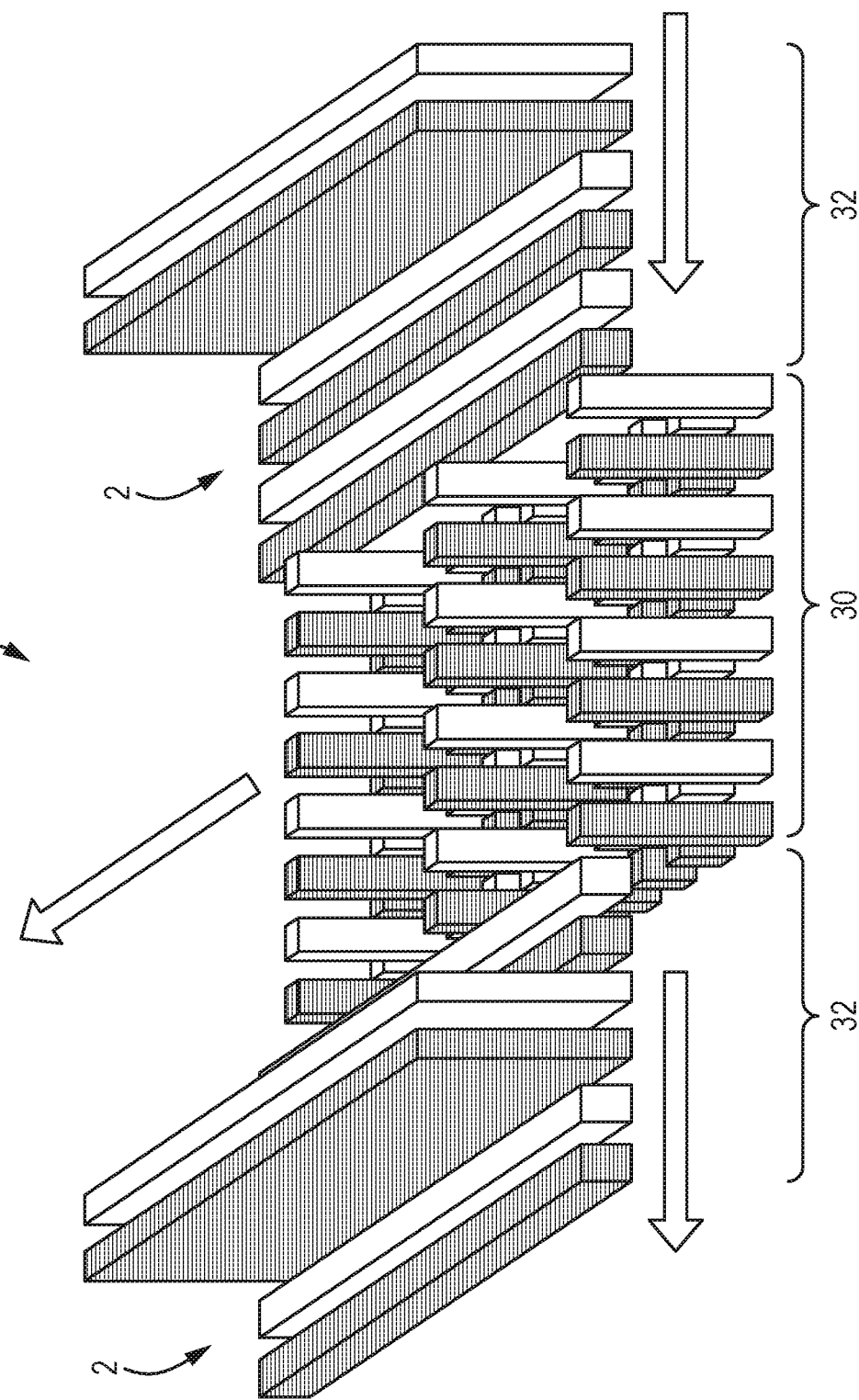

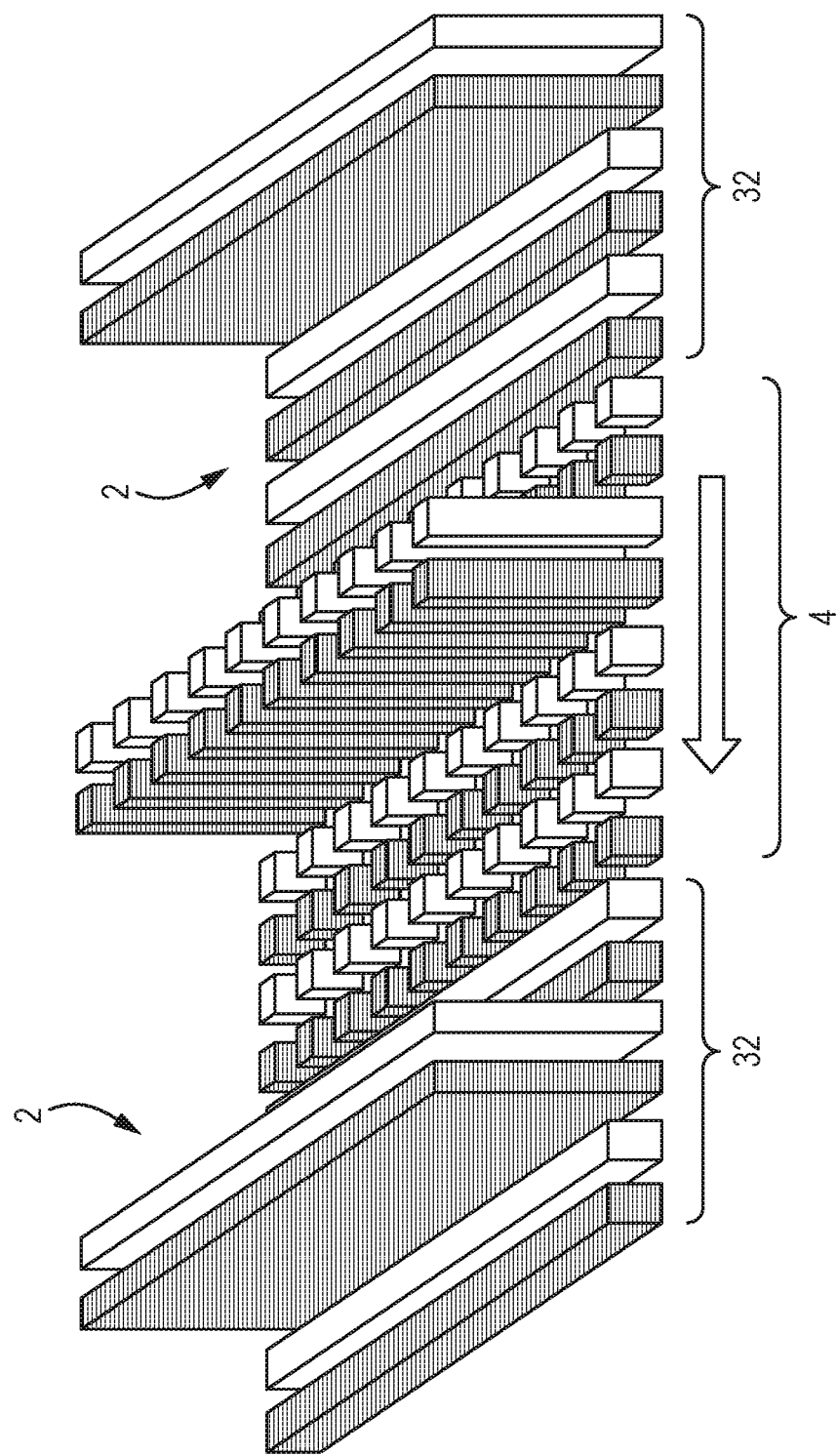

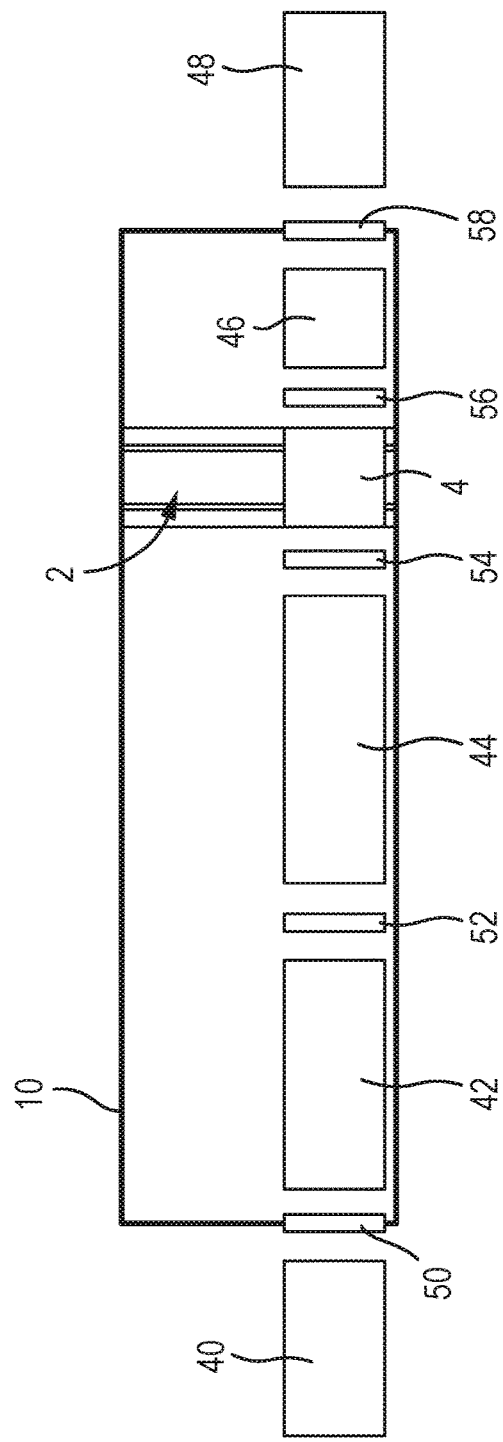
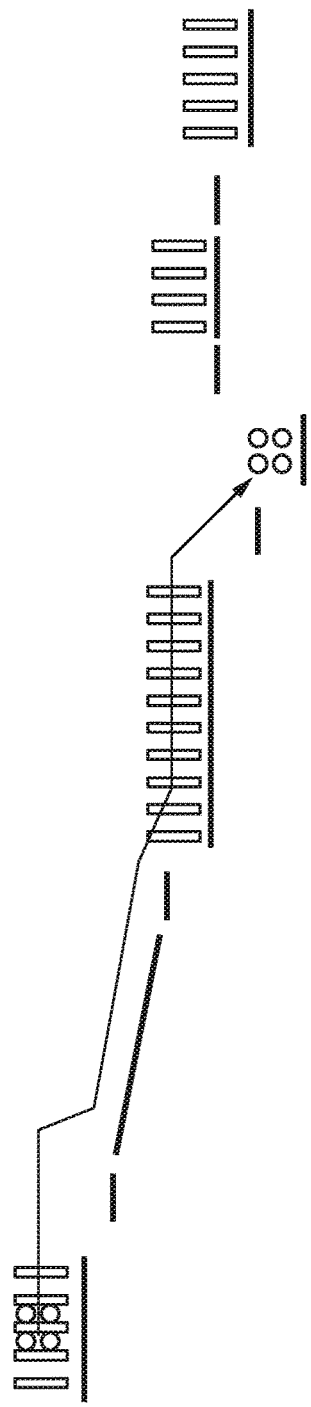

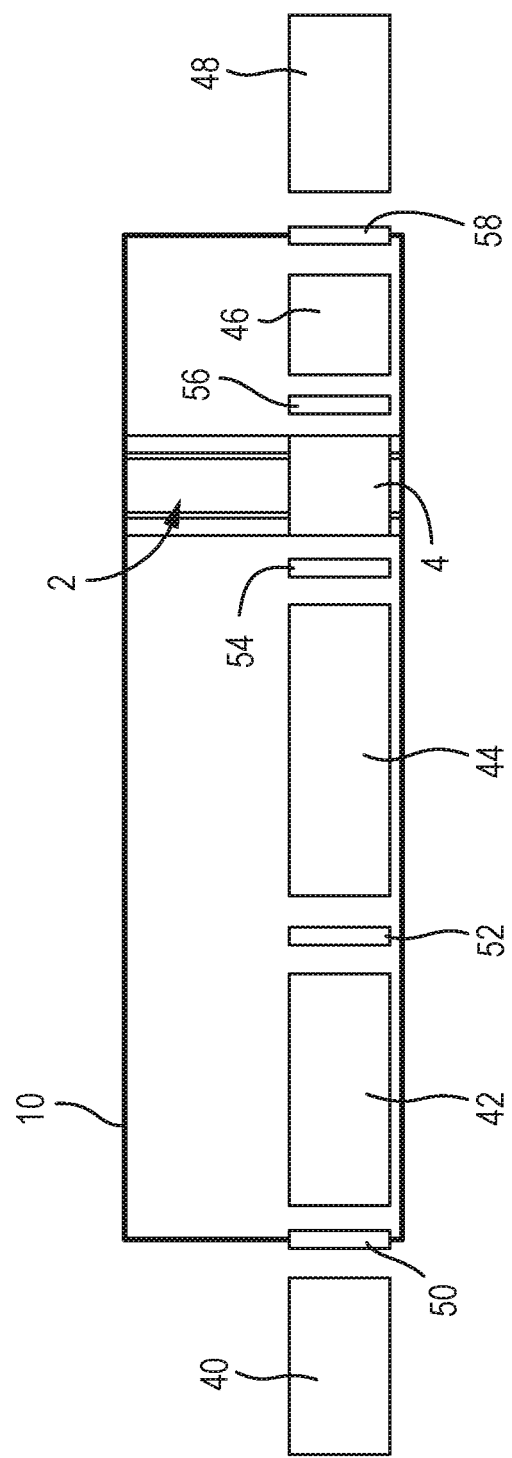
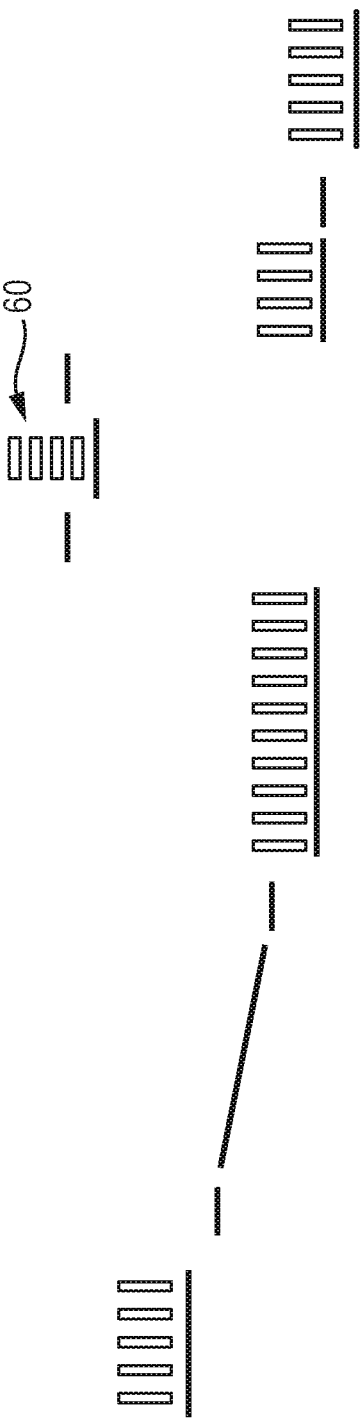

METHOD OF SELECTING IONS BY ION MOBILITY SEPARATION AND ISOLATION OF IONS

CROSS-REFERENCE TO RELATED APPLICATIONS

This application is a U.S. national phase filing claiming the benefit of and priority to International Patent Application No. PCT/GB2020/050839, filed Mar. 27, 2020, which claims priority from and the benefit of United Kingdom patent application No. 1904425.4 filed on Mar. 29, 2019. The entire contents of these applications are incorporated herein by reference.

FIELD OF THE INVENTION

The present invention provides a method of selecting ions using an analytical instrument such as a mass and/or ion mobility spectrometer, and in particular a method for selecting target ions of interest in complex samples.

BACKGROUND

Quadrupole mass filters are commonly used in mass spectrometry to select ions of interest having a particular mass to charge ratio (m/z). Quadrupole mass filters are typically capable of selecting ions with a mass to charge ratio window of around 1 Da.

However, even when operating with its highest resolution, a quadrupole mass filter may allow multiple different ions to pass (together with the ions of interest), especially for complex samples. This can cause problems in experiments where it is desired to isolate a single target ion of interest, such as in tandem mass spectrometry (MS/MS) experiments. For example, this can result in contaminated or mixed MS/MS spectra, leading to difficulties in interpretation of the spectra.

The Applicants believe that there remains scope for improvements to methods of selecting ions in methods of mass spectrometry.

SUMMARY

According to an aspect, there is provided a method of selecting ions, the method comprising selecting ions corresponding to a target ion of interest by:

separating analyte ions according to their ion mobility; and isolating first ions of the analyte ions within an ion mobility drift time range that corresponds to the target ion of interest;

wherein the ion mobility drift time range has a width that is less than the width of an ion mobility peak that corresponds to the target ion of interest.

Various embodiments relate to methods of mass and/or ion mobility spectrometry in which ions are selected (that is, isolated from other ions). According to various embodiments, ions corresponding to a target ion of interest are selected (isolated) from a plurality of analyte ions by (firstly) separating the analyte ions according to their ion mobility.

Separating the analyte ions according to their ion mobility will result in ions of the analyte ions that correspond to the target ion of interest being separated according to their ion mobility. Although these ions may (and in various embodiments do) have the same collision cross section (CCS), in practice separating these ions according to their ion mobility will result in ions traversing the ion mobility separator with some (small) range of ion mobility drift times. This may be due (amongst other things) primarily to diffusion effects.

Thus, separating the ions that correspond to the target ion of interest according to their ion mobility will result in those ions arriving at an exit region of the ion mobility separator over a spread or range of times (that is, with a spread or range of ion mobility drift times). This spread or range may have a characteristic width, which may be referred to as the "width of an ion mobility peak". Thus, according to various embodiments, the width an ion mobility peak that corresponds to the target ion of interest may be the range or width in ion mobility drift time that results from separating ions (that correspond to the target ion of interest and) that have the same collision cross section (CCS) according to their ion mobility.

According to various embodiments, following separation of the analyte ions according to their ion mobility, ions corresponding to the target ion of interest are selected (isolated) by isolating first ions of the (ion mobility separated) analyte ions that have ion mobility drift times within an ion mobility drift time range that corresponds to the target ion of interest. The ion mobility drift time range may correspond to the target ion of interest in that it may be (approximately) centred on the (centre of the) ion mobility peak that corresponds to the target ion of interest.

According to various embodiments, the ion mobility drift time range has a width that is less than the width in ion mobility drift time of the ion mobility peak that corresponds to the target ion of interest. That is, isolating the first ions may comprise isolating first ions of the analyte ions that have ion mobility drift times that fall within a range of ion mobility drift times, where the range has a width that is less than the range or width in ion mobility drift time that results from separating ions that correspond to the target ion of interest (and that have the same collision cross section (CCS)) according to their ion mobility.

This accordingly means that, in various embodiments, isolating the first ions comprises isolating (selecting) fewer than all of the ions that correspond to the target ion of interest (by isolating ions within an ion mobility drift time range that has a width that is less than the width of an ion mobility peak that corresponds to the target ion of interest).

As will be described in more detail below, the Applicants have recognised that isolating ions within a relatively narrow ion mobility range in this manner can allow ions corresponding to the target ion of interest to be isolated from other ions with an improved "selectivity" (that is in a manner that allows ions corresponding to the target ion of interest to be isolated from other ions that are relatively close in mass to charge ratio to the target ion of interest), for example compared to techniques in which ions are selected on the basis of their mass to charge ratio only.

This then allows, for example, improved selectivity in experiments where it is desired to isolate ions corresponding to a single target ion of interest, such as in tandem mass spectrometry (MS/MS) experiments, and accordingly reduced contamination in MS/MS spectra, thereby simplifying interpretation.

It will be appreciated, therefore, that the various embodiments provide an improved method of mass and/or ion mobility spectrometry.

The method may comprise:

separating the first ions according to their ion mobility; and isolating second ions of the first ions within a second ion mobility drift time range that corresponds to the target ion of interest.

According to an aspect, there is provided a method of selecting ions, the method comprising selecting ions corresponding to a target ion of interest by:

separating analyte ions according to their ion mobility;

isolating first ions of the analyte ions;

separating the first ions according to their ion mobility; and isolating second ions of the first ions.

Various embodiments relate to methods of mass and/or ion mobility spectrometry in which ions are selected (that is, isolated from other ions). According to various embodiments, ions corresponding to a target ion of interest are selected (isolated) by separating analyte ions according to their ion mobility, isolating first ions of the (ion mobility separated) analyte ions, separating the first ions according to their ion mobility, and then isolating second ions of the (ion mobility separated) first ions.

Isolating first ions of the analyte ions may comprise isolating ions within an ion mobility drift time window or range that corresponds to the target ion of interest, and isolating second ions of the first ions may comprise isolating ions within an ion mobility drift time window or range that corresponds to the target ion of interest. Thus, according to various embodiments, ions corresponding to a target ion of interest are selected (isolated) by performing multiple iterations of separating ions according to their ion mobility and isolating ions of the ion mobility separated ions that correspond to the target ion of interest.

As will be described in more detail below, the Applicants have recognised that performing multiple iterations of separation and isolation in this manner can allow ions corresponding to the target ion of interest to be isolated from other ions with an improved "selectivity" (that is in a manner that allows ions corresponding to the target ion of interest to be isolated from other ions that are relatively close in mass to charge ratio to the target ion of interest), for example compared to techniques in which ions are selected on the basis of their mass to charge ratio only.

This then allows, for example, improved selectivity in experiments where it is desired to isolate ions corresponding to a single target ion of interest, such as in tandem mass spectrometry (MS/MS) experiments, and accordingly reduced contamination in MS/MS spectra, thereby simplifying interpretation.

It will be appreciated, therefore, that the various embodiments provide an improved method of mass and/or ion mobility spectrometry.

Isolating the first ions of the analyte ions may comprise isolating ions within a first ion mobility drift time window or range that corresponds to the target ion of interest.

Isolating the second ions of the first ions may comprise isolating ions within a second ion mobility drift time window or range that corresponds to the target ion of interest.

The second ion mobility drift time range may have a width that is less than the width of an ion mobility peak that corresponds to the target ion of interest.

The method may comprise storing the isolated first ions in an ion trap.

The method may comprise storing the isolated second ions in an ion trap.

The method may comprise:

separating the analyte ions according to their ion mobility in an ion mobility separator;

storing the first ions in an ion trap;

separating the first ions according to their ion mobility in the ion mobility separator; and storing the second ions in the ion trap.

The ion trap may be arranged upstream of the ion mobility separator.

Alternatively, the ion trap may be arranged downstream of the ion mobility separator.

The method may comprise discarding analyte ions other than the first ions.

The method may comprise discarding first ions other than the second ions.

Separating the analyte ions according to their ion mobility may comprise separating the analyte ions according to their ion mobility using a cyclic or closed-loop separator.

Separating the first ions according to their ion mobility may comprise separating the first ions according to their ion mobility using a cyclic or closed-loop separator.

The method may comprise separating the second ions according to their ion mobility.

The method may comprise isolating third ions of the second ions within a third ion mobility drift time window or range that corresponds to the target ion of interest.

The method may comprise filtering the analyte ions according to their mass to charge ratio (before or after they are separated according to their ion mobility) using a mass to charge ratio window or range that corresponds to the target ion of interest.

According to an aspect there is provided a method of mass and/or ion mobility spectrometry, the method comprising:

selecting ions corresponding to a target ion of interest using the method described above; and analysing the isolated (first, second or third) ions and/or ions derived from the isolated (first, second or third) ions.

The method may comprise activating, fragmenting or reacting the isolated (first, second or third) ions to produce product ions, and analysing the product ions.

According to an aspect there is provided an analytical instrument such as a mass and/or ion mobility spectrometer comprising:

one or more ion mobility separators; and a control system, wherein the control system is configured to cause ions corresponding to a target ion of interest to be selected by:

causing the one or more ion mobility separators to separate analyte ions according to their ion mobility; and causing first ions of the analyte ions within a first ion mobility drift time range that corresponds to the target ion of interest to be isolated;

wherein the first ion mobility drift time range has a width that is less than the width of an ion mobility peak that corresponds to the target ion of interest.

The control system may be configured to cause ions corresponding to the target ion of interest to be selected by:

causing the one or more ion mobility separators to separate the first ions according to their ion mobility; and causing second ions of the first ions to be isolated.

According to an aspect there is provided an analytical instrument such as a mass and/or ion mobility spectrometer comprising:

one or more ion mobility separators; and a control system, wherein the control system is configured to cause ions corresponding to a target ion of interest to be selected by:

causing the one or more ion mobility separators to separate analyte ions according to their ion mobility;

causing first ions of the analyte ions to be isolated;

causing the one or more ion mobility separators to separate the first ions according to their ion mobility; and causing second ions of the first ions to be isolated.

The analytical instrument may be configured such that the first ions are isolated by isolating ions within a first ion mobility drift time window or range that corresponds to the target ion of interest.

The analytical instrument may be configured such that the second ions are isolated by isolating ions within a second ion mobility drift time window or range that corresponds to the target ion of interest.

The analytical instrument may be configured such that the second ions are isolated by isolating ions within a second ion mobility drift time range that corresponds to the target ion of interest.

The second ion mobility drift time range may have a width that is less than the width of an ion mobility peak that corresponds to the target ion of interest.

The analytical instrument may comprise one or more ion traps.

The analytical instrument may be configured such that the isolated first ions are stored in one or more of the one or more ion traps.

The analytical instrument may be configured such that the isolated second ions are stored in one or more of the one or more ion traps.

The one or more ion traps may be arranged upstream of the one or more ion mobility separators.

Alternatively, the one or more ion traps may be arranged downstream of the one or more ion mobility separators.

The one or more ion mobility separators may comprise a cyclic or closed-loop separator.

The analytical instrument may comprise a mass filter arranged upstream of or downstream of the one or more ion mobility separators.

The analytical instrument may comprise a fragmentation, activation or reaction device arranged downstream of the one or more ion mobility separators.

The analytical instrument of may comprise an analyser arranged downstream of the one or more ion mobility separators.

According to an aspect there is provided an analytical instrument comprising:

a cyclic or closed-loop ion mobility separator;

an ion trap arranged upstream of the ion mobility separator;

a control system, wherein the control system is configured to cause ions corresponding to a target ion of interest to be selected by: (i) causing analyte ions to be separated by the ion mobility separator, (ii) causing first ions of the analyte ions to be isolated and stored in the ion trap, (iii) causing the first ions to be separated by the ion mobility separator, and (iv) causing second ions of the first ions to be isolated and stored in the ion trap; and an analyser configured to analyse the second ions and/or ions derived from the second ions.

According to an aspect there is provided an analytical instrument comprising:

an ion mobility separator; and a mass filter arranged downstream of the ion mobility separator;

wherein the mass filter is configured to sequentially select and transmit, optionally during an ion mobility cycle of separation, one or more different precursor ions at one or more different ion mobility drift times; and wherein ion mobility drift time window at which selected precursor ions are transmitted is further reduced by temporal gating.

The width of the ion mobility drift time window (transmission time) for each selected precursor ion may be less than the diffusion limited ion mobility peak width for that precursor ion.

Each of the aspects and embodiments described herein can, and in various embodiments do, include any one or more or all of the features described herein.

BRIEF DESCRIPTION OF THE DRAWINGS

Various embodiments of the present invention will now be described, by way of example only, and with reference to the accompanying drawings in which:

FIG. 6 shows schematically electrical potentials that may be applied to the ion entry/exit device during a mode in which ions are injected/loaded into the entry/exit device from outside of the drift cell;

FIG. 7 shows schematically electrical potentials that may be applied to the ion entry/exit device during a mode in which ions are driven out of the ion entry/exit region and into the adjacent part of the drift cell;

FIG. 8A shows a schematically an embodiment of a spectrometer comprising the IMS device, and FIG. 8B shows a potential energy diagram of the DC potentials that may be applied to the components of the spectrometer in a mode in which ions are being accumulated in the ion entry/exit device of the drift cell;

FIGS. 10A and 10B show DC potentials that may be applied to the spectrometer at a stage when the ions are driven out of the ion entry/exit device into the adjacent part of the IMS drift cell;

DETAILED DESCRIPTION

A number of mass spectrometric techniques involve selecting ions corresponding to a particular target ion of interest. In particular, in tandem mass spectrometry, one or more target "precursor" ions of interest are sequentially selected and fragmented. The resulting fragment or product ions are analysed in order to provide a fragment ion spectrum in respect of each target ion of interest.

In these techniques, a quadrupole mass filter is commonly used to select the ions corresponding to the target precursor ion of interest.

Figure 1A:
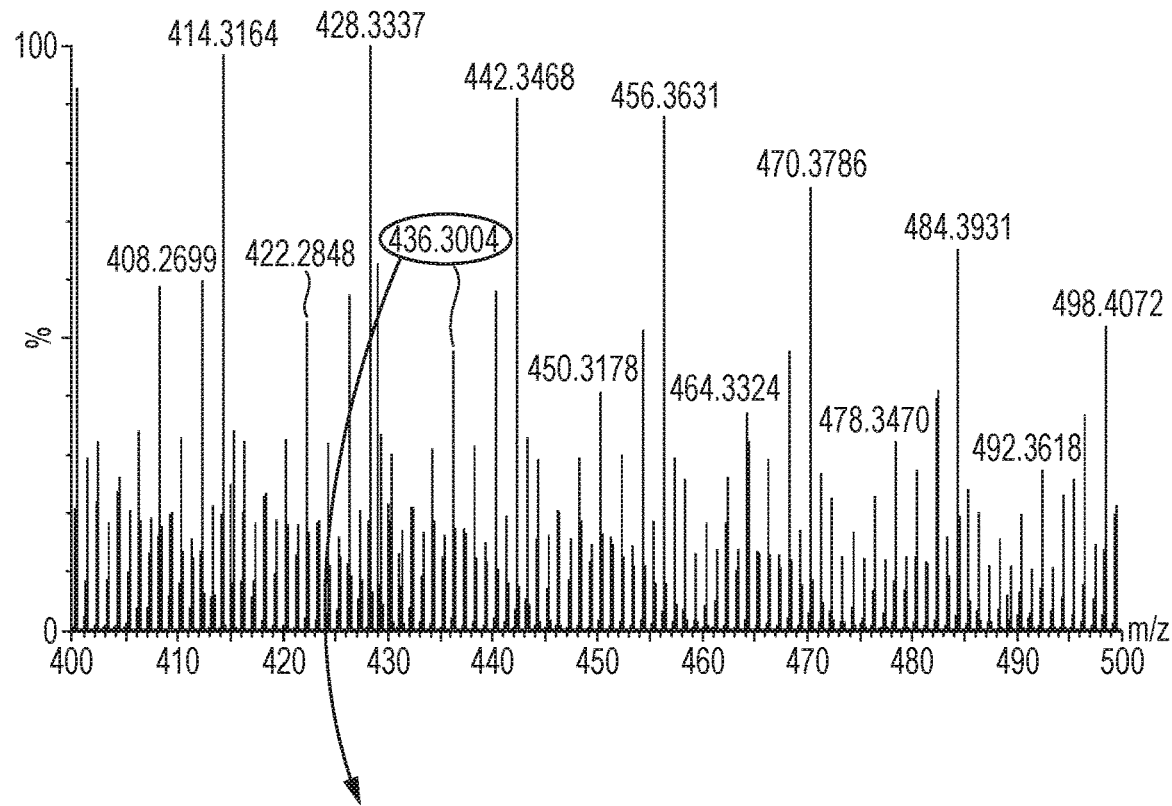
FIG. 1A shows a mass spectrum of a crude oil sample.

FIG. 1A shows an example mass spectrum from a crude oil sample. As can be seen from FIG. 1A, crude oil comprises an extremely complex mixture of analytes, which give rise to a complex mixture of ions.

Figure 1B:
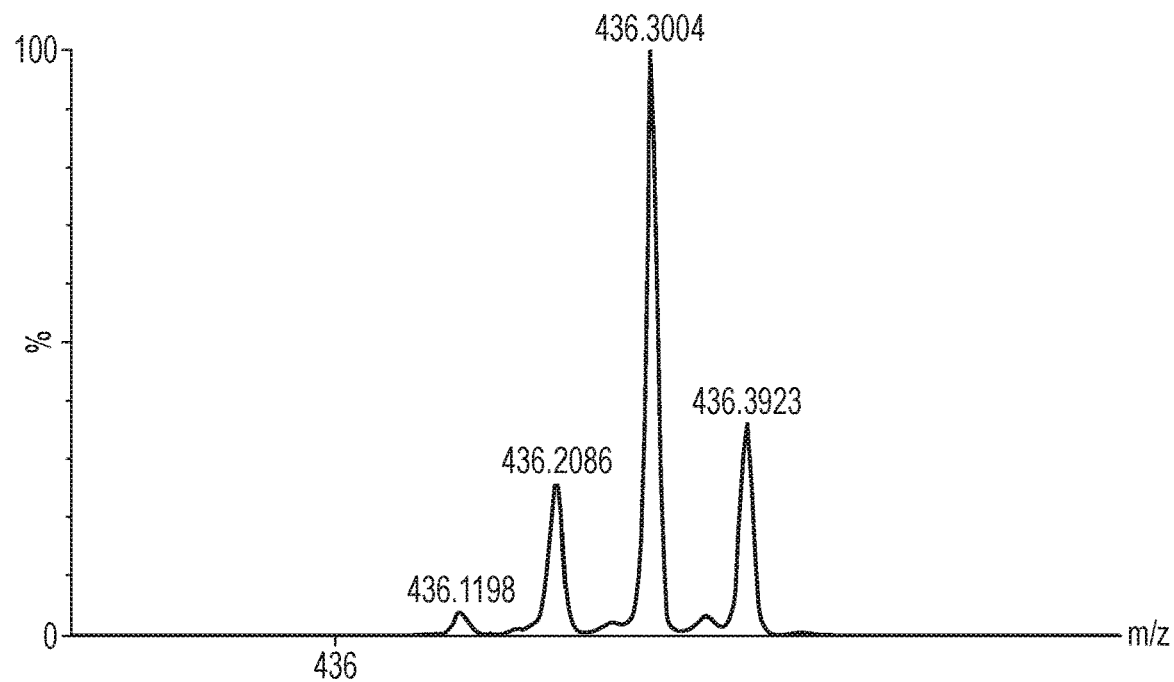
FIG. 1B shows a mass spectrum for the crude sample when ions are selected using a quadrupole mass filter.

FIG. 1B shows a mass spectrum for the same crude oil sample, where a quadrupole mass filter has been used to (attempt to) isolate ions corresponding to a target ion of interest (in this example having a mass to charge ratio of 436.3004) from the other ions.

As can be seen from FIG. 1B, although the quadrupole mass filter is capable of isolating the target ion of interest from most of the other ions, it is incapable of isolating the target ion of interest from other ions that are relatively close in mass to charge ratio to the target ion of interest (in this example, ions having mass to charge ratios of 436.1198, 436.2086, and 436.3923 are transmitted by the quadrupole mass filter together with the target ion of interest which has a mass to charge ratio of 436.3004).

This is because typical quadrupole mass filters have a maximum resolution which means that they are capable of selecting ions within a mass to charge ratio window of around 1 Da, whereas in the example data shown in FIG. 1 each major ion in the cluster of ions surrounding the ion of interest is separated by only around 90 mDa. That is, in complex samples such as crude oil, many analytes can be observed within a narrow mass to charge ratio range.

This problem can arise for various types of complex sample (that is, samples for which plural ion peaks can be observed within a narrow mass to charge ratio range (which range may correspond to the transmission window of a quadrupole mass filter operating at its maximum resolution), of, for example, around 1 Da). Example sample types include hydrocarbons such as crude oil, polymers such as synthetic polymers, and so on.

Thus, even when operating with its highest resolution, a quadrupole mass filter may allow ions corresponding to multiple different ions to pass (together with ions corresponding to the target ion of interest), especially for complex samples.

This can cause problems in experiments where it is desired to isolate a single target ion of interest, such as in tandem mass spectrometry (MS/MS) experiments. For example, this can result in contaminated or mixed MS/MS spectra, leading to difficulties in interpretation.

Various embodiments relate to a method of selecting ions, in which ions corresponding to a target ion of interest are selected (that is, isolated from other ions) by: separating analyte ions according to their ion mobility, and isolating first ions of the (ion mobility separated) analyte ions within an ion mobility drift time range that corresponds to the target ion of interest. The ion mobility drift time range may have a width that is less than the width of an ion mobility peak that corresponds to the target ion of interest.

Isolating ions within a relatively narrow ion mobility drift time range in this manner can allow ions corresponding to the target ion of interest to be isolated from other ions with an improved "selectivity" (that is in a manner that allows ions corresponding to the target ion of interest to be isolated from other ions that are relatively close in mass to charge ratio to the target ion of interest), for example compared to techniques in which ions are selected on the basis of their mass to charge ratio only.

This then allows, for example, improved selectivity in experiments where it is desired to isolate ions corresponding to a single target ion of interest, such as in tandem mass spectrometry (MS/MS) experiments, and accordingly reduced contamination in MS/MS spectra, thereby simplifying interpretation.

Various particular embodiments relate to a method of selecting ions, in which ions corresponding to a target ion of interest are selected (that is, isolated from other ions) by: separating analyte ions according to their ion mobility, isolating first ions of the (ion mobility separated) analyte ions, separating the first ions according to their ion mobility, and isolating second ions of the (ion mobility separated) first ions.

In these embodiments, isolating first ions of the analyte ions may comprise isolating ions within an ion mobility drift time window or range that corresponds to (that is centred on the ion mobility drift time of) the target ion of interest, and isolating second ions of the first ions may comprise isolating ions within an ion mobility drift time window or range that corresponds to (that is centred on the ion mobility drift time of) the target ion of interest. Thus, according to various embodiments, ions corresponding to a target ion of interest are selected (isolated) by performing multiple iterations of separating ions according to their ion mobility and isolating ions of the ion mobility separated ions that correspond to the target ion of interest.

Performing multiple iterations of separation and isolation in this manner can allow ions corresponding to the target ion of interest to be isolated from other ions with an improved "selectivity" (that is in a manner that allows ions corresponding to the target ion of interest to be isolated from other ions that are relatively close in mass to charge ratio to the target ion of interest), for example compared to techniques in which ions are selected on the basis of their mass to charge ratio only.

This then again allows, for example, improved selectivity in experiments where it is desired to isolate ions corresponding to a single target ion of interest, such as in tandem mass spectrometry (MS/MS) experiments, and accordingly reduced contamination in MS/MS spectra, thereby simplifying interpretation.

The method of selecting ions may be performed as part of a method of mass and/or ion mobility spectrometry. The method of mass and/or ion mobility spectrometry may be, for example, a mass spectrometry ("MS") method or a tandem mass spectrometry ("MS/MS") method.

Where the method is a mass spectrometry ("MS") method, it may be desired to select ions corresponding to a particular target ion of interest, and (for example) to then analyse the selected ions so as to determine one or more properties of the target ion of interest, such as its mass to charge ratio, intensity and/or abundance.

Where the method is a tandem mass spectrometry ("MS/MS") method, it may be desired to select ions corresponding to a particular target precursor ion of interest, to fragment, activate or react the selected ions so as to produce product ions, and to then analyse the product ions so as to provide information regarding one or more properties of the product ions that are derived from the target precursor ion of interest, such as a product ion mass spectrum in respect of the target precursor ion of interest.

The target ion of interest (and the ions corresponding to the target ion of interest) may be a precursor ion. The target ion of interest (and the ions corresponding to the target ion of interest) will have a particular mass to charge ratio. Thus, various embodiments comprise selecting ions (corresponding to a target ion of interest) that have a particular mass to charge ratio in the manner described herein. The target ion of interest (and the ions corresponding to the target ion of interest) will also have a particular ion mobility value (or "collision cross section").

In various embodiments, it may be desired to select ions corresponding to each of plural target ions of interest, for example sequentially, for example in turn (one by one). Thus, ions corresponding to each of more than one particular target ion of interest may be sequentially selected in turn. Each target ion of interest may have a different mass to charge ratio and/or a different ion mobility value (collision cross section).

Various embodiments may comprise ionising an analyte to produce the analyte ions. Thus, in various embodiments, the analytical instrument comprises an ion source configured to generate the analyte ions. The analyte ions may be ionised using any suitable ionisation source or technique, for example as described below.

The analyte may comprise any suitable analyte. In various embodiments, the analyte comprises a complex sample, that is, a sample for which plural ion peaks can be observed within a narrow mass to charge ratio range (which range may correspond to the transmission window of a quadrupole mass filter operating at its maximum resolution), of, for example, around 1 Da. Example sample types include hydrocarbons such as for example crude oil, polymers such as synthetic polymers, and so on.

Thus, in various embodiments, the analyte comprises a hydrocarbon sample (and the analyte ions comprise hydrocarbon ions (or fragments thereof)). In various particular embodiments, the analyte comprises crude oil (and the analyte ions comprise ions from a crude oil sample).

In various other embodiments, the analyte comprises a polymer sample (and the analyte ions comprise polymer ions (or fragments thereof)). In these embodiments, the polymer may comprise any suitable polymer or combination of polymers, such as a synthetic polymer and/or a natural polymer. In particular, the polymer sample may comprise a synthetic polymer or a mixture of synthetic polymers. The polymer sample may comprise a copolymer or a homopolymer. In particular, the polymer may be a copolymer. The polymer may be a polyether. One example representative polymer sample comprises a solution of poly(ethylene glycol)-poly(propylene glycol) random co-polymer (PEG-ran-PPG).

Ionising the analyte may produce a plurality of different (precursor) analyte ions, where each different analyte ion has a different mass to charge ratio and/or a different value of ion mobility (collision cross section). Various embodiments comprise selecting ions corresponding to the target ion of interest from the plurality of different analyte ions in the manner described herein.

According to various embodiments, ions produced by ionising the analyte may optionally be initially selected (filtered) using a mass filter such as a quadrupole mass filter (and the so-selected analyte ions may then be separated according to their ion mobility). Thus, the analytical instrument may comprise a mass filter such as a quadrupole mass filter arranged downstream of the ion source (and upstream of the ion mobility separator).

Additionally or alternatively, the separated analyte ions and/or the isolated first ions may optionally be selected (filtered) using a mass filter such as a quadrupole mass filter. Thus, the analytical instrument may comprise a mass filter such as a quadrupole mass filter arranged downstream of the ion mobility separator.

The mass filter may be configured to isolate (select) ions corresponding to the target ion of interest by filtering the ions according to their mass to charge ratio. To do this, the mass filter may be operated such that ions having a desired mass to charge ratio (corresponding to the mass to charge ratio of the target ion) or having mass to charge ratios within a desired mass to charge ratio range (which range may be centred on the mass to charge ratio of the target ion) will be retained and/or onwardly transmitted by the mass filter. Ions having mass to charge ratio values other than the desired mass to charge ratio or outside of the desired mass to charge ratio range may be lost and/or substantially attenuated.

Thus, the mass filter may be configured to select (isolate) ions within a mass to charge ratio window or range that corresponds to (that is centred on the mass to charge ratio of) the target ion of interest. The effect of this will be to "purify" the ions so that the relative proportion of ions corresponding to the target ion of interest is increased. (However, as described above, even when operating at its highest resolution, a mass filter such as a quadrupole mass filter may allow multiple different ions to pass (together with the ions of interest), especially for complex samples.)

In various embodiments, where it is desired to select ions corresponding to each of plural target ions of interest sequentially in turn (one by one), the mass filter may be operated so as to sequentially select and transmit each of said plural target ions of interest. This may be done based upon the ion mobility drift time and/or mass to charge ratio of each of the plural target ions of interest. This may involve altering the set mass (that is, the mass to charge ratio or the centre of the mass to charge ratio range at which ions are selected and/or transmitted by the mass filter) of the mass filter while ions emerge from the ion mobility separator so as to sequentially select and transmit each of said plural target ions of interest. According to various embodiments, this is done in the manner described in WO2013/140132 (Micromass), the entire contents of which is herein incorporated by reference.

According to various embodiments, the analyte ions are separated according to their ion mobility. All or most of the analyte ions produced by ionising the analyte may be separated according to their ion mobility. However, according to various embodiments, only a subset of the analyte ions produced by ionising the analyte are separated according to their ion mobility. In various embodiments (as described above), (only) those analyte ions that are transmitted by the mass filter are separated according to their ion mobility.

The analyte ions may be separated according to their ion mobility in any suitable manner, in embodiments using an ion mobility separator. Any suitable ion mobility separator may be provided and used, for example as described below.

The analyte ions should be (and in various embodiments are) separated according to their ion mobility such that analyte ions having different ion mobilities (collision cross sections) arrive at an exit region of the ion mobility separator at different times, for example such that ions with relatively high ion mobilities arrive at the exit region ahead of ions with relatively low ion mobilities (or such that ions with relatively low values of ion mobility arrive at the exit region ahead of ions with relatively high values of ion mobility).

Where, as described below, the ion mobility separator comprises a cyclic or closed-loop separator, the analyte ions may be separated by causing the analyte ions to make any integer number of cycles of the cyclic or closed-loop separator, such as for example one or more than one cycle of the cyclic or closed-loop separator.

Separating the analyte ions according to their ion mobility will result in ions of the analyte ions that correspond to the target ion of interest being separated according to their ion mobility. Although these ions may (and in various embodiments do) have the same ion mobility value or collision cross section (CCS), in practice separating these ions according to their ion mobility will result in ions traversing the ion mobility separator with some (small) range of ion mobility drift times. This may be due (amongst other things) primarily to diffusion effects.

Thus, separating the ions that correspond to the target ion of interest according to their ion mobility will result in those ions arriving at an exit region of the ion mobility separator over a spread or range of times (that is, with a spread or range of ion mobility drift times). This spread or range may have a characteristic width, which may be referred to as the "width of an ion mobility peak".

Thus, according to various embodiments, the width an ion mobility peak that corresponds to the target ion of interest may be the range or width in ion mobility drift time that results from separating ions (that correspond to the target ion of interest and) that have the same collision cross section (CCS) according to their ion mobility.

According to various embodiments, first ions of the analyte ions are isolated from other ions of the analyte ions. This may comprise selecting the first ions of the analyte ions. The first ions may comprise a subset of the analyte ions. Thus, the first ions (like the analyte ions) may comprises precursor (non-fragmented) ions.

According to various embodiments, the first ions are selected on the basis of their ion mobility drift time. That is, analyte ions having a particular selected (narrow) range of ion mobility drift times are isolated (selected), that is, isolated from other ions that have ion mobility drift times falling outside the particular selected range of ion mobility drift times. Thus, the first ions may be a subset of the analyte ions that have a particular (narrow) range of ion mobility values.

The range of ion mobility drift times may correspond to the target ion of interest. That is, the range of ion mobility drift times may be selected such that some, most or all of the ions corresponding to the target ion are selected, whereas some or most of the other ions are not (are other than) selected. Thus, isolating first ions of the analyte ions may comprise isolating ions within an ion mobility drift time window or range that corresponds to the target ion of interest.

Thus, ions corresponding to the target ion of interest may be selected (isolated) by isolating first ions of the (ion mobility separated) analyte ions that have ion mobility drift times within an ion mobility drift time range that corresponds to the target ion of interest. The ion mobility drift time range may correspond to the target ion of interest in that it may be (approximately) centred on the (centre of the) ion mobility peak that corresponds to the target ion of interest.

Thus, in various embodiments, the range of ion mobility drift times is (approximately) centred on (the centre of) the ion mobility drift time of the target ion of interest.

The width of the range of ion mobility drift times may be selected as desired. The width of the range of ion mobility drift times may be selected to afford a compromise between discarding as many ions that are unrelated to the target ion of interest as possible, and retaining as many ions that correspond to the target ion of interest as possible. Suitable widths for the range of ion mobility drift times may be, for example, around (i)<0.5 ms; (ii) 0.5-1 ms; (iii) 1-1.5 ms; (iv) 1.5-2 ms; or (v)>2 ms.

According to various particular embodiments, the ion mobility drift time range has a width that is less than the width in ion mobility drift time of the ion mobility peak that corresponds to the target ion of interest. That is, isolating the first ions may comprise isolating first ions of the analyte ions that have ion mobility drift times that fall within a range of ion mobility drift times, where the range has a width that is less than the range or width in ion mobility drift time that results from separating ions that correspond to the target ion of interest (and that have the same collision cross section (CCS)) according to their ion mobility. In other words, the width of the range of ion mobility drift times may be less than the width of a diffusion limited ion mobility peak.

This accordingly means that, according to various embodiments, isolating the first ions comprises isolating (selecting) fewer than all of the ions that correspond to the target ion of interest (by isolating ions within an ion mobility drift time range that has a width that is less than the width of an ion mobility peak that corresponds to the target ion of interest).

In these embodiments, the width of the ion mobility drift time range may be less than the width of the ion mobility peak that corresponds to the target ion of interest by any suitable amount. According to various embodiments, the width of the ion mobility drift time range may be around (i) 90% or less; (ii) 80% or less; (iii) 70% or less; (iv) 60% or less; or (v) 50% or less, of the width of the ion mobility peak that corresponds to the target ion of interest.

Thus, the ion mobility separator may be operated such that ions having ion mobility drift times within a desired ion mobility drift time range (which range may be (approximately) centred on the ion mobility drift time of the target ion) are isolated (selected). The effect of this will be to (further) "purify" the ions so that the relative proportion of ions corresponding to the target ion of interest is increased.

The first ions may be isolated from other ions of the analyte ions by, for example, storing the first ions in an ion trap and, for example, discarding the other analyte ions (or otherwise). In these embodiments, any suitable ion trap may be provided and used, such as for example the ion trap or store described in more detail below. The ion trap or store may be located upstream from the ion mobility separator. Thus, isolating the first ions of the analyte ions may comprise passing the first ions from the separator (upstream) to the ion trap or store.

Other arrangements would, however, be possible. For example, the ion trap or store may be located downstream from the ion mobility separator. Thus, isolating the first ions of the analyte ions may comprise passing the first ions from the separator (downstream) to the ion trap or store.

Ions having ion mobility drift times outside of the desired ion mobility drift time range may, for example, be discarded. Additionally or alternatively, some or all of the other analyte ions may themselves be isolated (for example stored in an ion trap), further processed and/or analysed.

According to various embodiments, the (isolated) first ions or ions derived from the first ions may optionally be analysed. All or most of the first ions (or ions derived from all or most of the first ions) may be analysed. Alternatively, only a subset of the first ions (or ions derived from only a subset of the first ions) may be analysed. For example, in various embodiments (as described below), (only) the isolated second or third ions (or ions derived from the second or third ions) are analysed.

Analysing the first ions or ions derived from the first ions may comprise detecting the first ions and/or detecting ions derived from the first ions, for example using an ion detector. This may comprise analysing the first ions and/or analysing ions derived from the first ions, for example using a mass analyser, so as to determine their mass to charge ratio.

The mass analyser may comprise any suitable mass analyser, for example as described below. The ion detector may comprise any suitable ion detector, for example as described below.

In these embodiments, the first ions themselves may be analysed. That is, some or all of the isolated first ions may be analysed (by the mass analyser) so as to determine the mass to charge ratio, intensity and/or abundance of the first ions.

According to various other embodiments, ions derived from the first ions may be analysed. That is, some or all ions derived from some or all of the isolated first ions may be analysed (by the mass analyser) so as to determine the mass to charge ratio, intensity and/or abundance of the ions derived from the first ions.

In these embodiments, the ions that are derived from the first ions may be derived from the first ions in any suitable manner. In various particular embodiments, some or all of the isolated first ions may be activated, fragmented or reacted to produce product ions (and the product ions may then be analysed).

Where ions are activated, fragmented or reacted to produce product ions, this may be done using an activation, fragmentation, collision or reaction device. The or each activation, fragmentation, collision or reaction device can comprise any suitable such device, for example as described below.

Thus, according to various embodiments, some, most or all of the isolated first ions are activated, fragmented or reacted to produce product ions, and the product ions are analysed so as to produce a product ion spectrum in respect of the target ion of interest. Since the first ions will have been "purified" (so as to increase the relative proportion of ions corresponding to the target ion of interest) in the manner described above, the "purity" of the so-produce product ion spectrum will be increased, thereby simplifying its interpretation.

According to various embodiments, the isolated first ions may be separated according to their ion mobility. All or most of the first ions may be separated according to their ion mobility. Where the isolated first ions are stored in an ion trap, separating the first ions according to their ion mobility may comprises passing the first ions from the ion trap (downstream) into the ion mobility separator (and then separating the first ions).

The first ions may be separated according to their ion mobility in any suitable manner, in embodiments using an ion mobility separator. Any suitable ion mobility separator may be provided and used, for example as described below.

In various embodiments, the first ions are separated using the same ion mobility separator that was used to separate the analyte ions. However, it would be possible to use a first ion mobility separator to separate the analyte ions and one or more second different ion mobility separators to separate the first ions, if desired.

The first ions should be (and in various embodiments are) separated according to their ion mobility such that first ions having different ion mobilities arrive at an exit region of the ion mobility separator at different times, for example such that ions with relatively high ion mobilities arrive at the exit region ahead of ions with relatively low ion mobilities (or such that ions with relatively low values of ion mobility arrive at the exit region ahead of ions with relatively high values of ion mobility).

Where, as described below, the ion mobility separator comprises a cyclic or closed-loop separator, the first ions may be separated by causing the first ions to make any integer number of cycles of the cyclic or closed-loop separator such as for example one or more than one cycle of the cyclic or closed-loop separator. In various embodiments, the analyte ions are separated using a first integer number of cycles, and the first ions are separated using a second integer number of cycles, where the second integer number of cycles is greater than, equal to or less than the first integer number of cycles.

According to various embodiments, second ions of the first ions are isolated from other ions of the first ions. This may comprise selecting the second ions of the first ions. The second ions may comprise a subset of the first ions (and so the second ions may comprise a subset of the analyte ions). Thus, the second ions (like the first and analyte ions) may comprises precursor (non-fragmented) ions.

According to various embodiments, the second ions are selected on the basis of their ion mobility drift time. That is, first ions having a particular selected (narrow) range of ion mobility drift times are isolated (selected), that is, isolated from other ions that have ion mobility drift times falling outside the particular selected range of ion mobility drift times. Thus, the second ions may be a subset of the first ions that have a particular (narrow) range of ion mobility values.

The range of ion mobility drift times may correspond to the target ion of interest. That is, the range of ion mobility drift times may be selected such that some, most or all of the ions corresponding to the target ion are selected, whereas some or most of the other ions are not (are other than) selected. Thus, isolating second ions of the first ions may comprise isolating ions within an ion mobility drift time window or range that corresponds to the target ion of interest.

In various embodiments, the range of ion mobility drift times is (approximately) centred on the ion mobility drift time of the target ion of interest.

The width of the range of ion mobility drift times may be selected as desired. The width of the range of ion mobility drift times may be selected to afford a compromise between discarding as many ions that are unrelated to the target ion of interest as possible, and retaining as many ions that correspond to the target ion of interest as possible. Suitable widths for the range of ion mobility drift times may be, for example, around (i)<0.5 ms; (ii) 0.5-1 ms; (iii) 1-1.5 ms; (iv) 1.5-2 ms; or (v)>2 ms.

According to various particular embodiments, the ion mobility drift time range has a width that is less than the width in ion mobility drift time of the ion mobility peak that corresponds to the target ion of interest. That is, isolating the second ions may comprise isolating second ions of the first ions that have ion mobility drift times that fall within a range of ion mobility drift times, where the range has a width that is less than the range or width in ion mobility drift time that results from (twice) separating ions that correspond to the target ion of interest (and that have the same collision cross section (CCS)) according to their ion mobility. In other words, the width of the range of ion mobility drift times may be less than the width of a diffusion limited ion mobility peak.

This accordingly means that, according to various embodiments, isolating the second ions comprises isolating (selecting) fewer than all of the ions that correspond to the target ion of interest (by isolating ions within an ion mobility drift time range that has a width that is less than the width of an ion mobility peak that corresponds to the target ion of interest).

In these embodiments, the width of the ion mobility drift time range may be less than the width of the ion mobility peak that corresponds to the target ion of interest by any suitable amount. According to various embodiments, the width of the ion mobility drift time range may be around (i) 90% or less; (ii) 80% or less; (iii) 70% or less; (iv) 60% or less; or (v) 50% or less, of the width of the ion mobility peak that corresponds to the target ion of interest.

Thus, the ion mobility separator may be operated such that ions having ion mobility drift times within a desired ion mobility drift time range (which range may be (approximately) centred on the ion mobility drift time of the target ion) are isolated (selected). The effect of this will be to (further) "purify" the ions so that the relative proportion of ions corresponding to the target ion of interest is increased.

Ions having ion mobility drift times outside of the desired ion mobility drift time range may, for example, be discarded. Additionally or alternatively, some or all of the other first ions may themselves be isolated (for example stored in an ion trap), further processed and/or analysed.

The second ions may be isolated from other ions of the first ions, for example by storing the second ions in an ion trap and then, for example, discarding the other first ions (or otherwise). In these embodiments, any suitable ion trap may be provided and used, such as for example the ion trap or store described further below. The ion trap or store may be located upstream from the ion mobility separator. Thus, isolating the second ions of the first ions may comprise passing the second ions from the separator (upstream) to the ion trap or store.

Alternatively, the ion trap or store may be located downstream from the ion mobility separator. Thus, isolating the second ions of the first ions may comprise passing the second ions from the separator (downstream) to the ion trap or store. In various embodiments, the second ions are stored in the same ion trap that was used to store the first ions. However, it would be possible to use a first ion trap to store the first ions and a second different ion trap to store the second ions, if desired.

According to various embodiments, the isolated second ions may optionally be separated according to their ion mobility. All or most of the second ions may be separated according to their ion mobility. Where the isolated second ions are stored in an ion trap, separating the second ions according to their ion mobility may comprises passing the second ions from the ion trap (downstream) into the ion mobility separator (and then separating the first ions).

The second ions may be separated according to their ion mobility in any suitable manner, in embodiments using an ion mobility separator. Any suitable ion mobility separator may be provided and used, for example as described below.

In various embodiments, the second ions are separated using the same ion mobility separator that was used to separate the first and/or analyte ions. However, it would be possible to use a third different ion mobility separators to separate the second ions, if desired.

The second ions should be (and in various embodiments are) separated according to their ion mobility such that second ions having different ion mobilities arrive at an exit region of the ion mobility separator at different times, for example such that ions with relatively high ion mobilities arrive at the exit region ahead of ions with relatively low ion mobilities (or such that ions with relatively low values of ion mobility arrive at the exit region ahead of ions with relatively high values of ion mobility).

Where, as described below, the ion mobility separator comprises a cyclic or closed-loop separator, the second ions may be separated by causing the second ions to make any integer number of cycles of the cyclic or closed-loop separator, for example one or more than one cycle of the cyclic or closed-loop separator. In various embodiments, the second ions are separated using a third integer number of cycles, where the third integer number of cycles is greater than, equal to or less than the second and/or first integer number of cycles.

According to various embodiments, third ions of the second ions may optionally be isolated from other ions of the second ions. This may comprise selecting the third ions of the second ions. The third ions may comprise a subset of the second ions (and so a subset of the first ions, and a subset of the analyte ions).

Thus, the third ions (like the analyte, first and second ions) may comprises precursor (non-fragmented) ions.

According to various embodiments, the third ions are selected on the basis of their ion mobility drift time. That is, second ions having a particular selected (narrow) range of ion mobility drift times may be isolated (selected), that is, isolated from other ions that have ion mobility drift times falling outside the particular selected range of ion mobility drift times. Thus, the third ions may be a subset of the second ions that have a particular (narrow) range of ion mobility values.

The range of ion mobility drift times may correspond to the target ion of interest. That is, the range of ion mobility drift times may be selected such that some, most or all of the ions corresponding to the target ion are selected, whereas some or most of the other ions are not (are other than) selected. Thus, isolating third ions of the second ions may comprise isolating ions within an ion mobility drift time window or range that corresponds to the target ion of interest.

In various embodiments, the range of ion mobility drift times is (approximately) centred on the ion mobility drift time of the target ion of interest.

The width of the range of ion mobility drift times may be selected as desired. The width of the range of ion mobility drift times may be selected to afford a compromise between discarding as many ions that are unrelated to the target ion of interest as possible, and retaining as many ions that correspond to the target ion of interest as possible. Suitable widths for the range of ion mobility drift times may be, for example, around (i)<0.5 ms; (ii) 0.5-1 ms; (iii) 1-1.5 ms; (iv) 1.5-2 ms; or (v)>2 ms.

According to various particular embodiments, the ion mobility drift time range has a width that is less than the width in ion mobility drift time of the ion mobility peak that corresponds to the target ion of interest. That is, isolating the third ions may comprise isolating third ions of the second ions that have ion mobility drift times that fall within a range of ion mobility drift times, where the range has a width that is less than the range or width in ion mobility drift time that results from separating (three times) ions that correspond to the target ion of interest (and that have the same collision cross section (CCS)) according to their ion mobility. In other words, the width of the range of ion mobility drift times may be less than the width of a diffusion limited ion mobility peak.

This accordingly means that, according to various embodiments, isolating the third ions comprises isolating (selecting) fewer than all of the ions that correspond to the target ion of interest (by isolating ions within an ion mobility drift time range that has a width that is less than the width of an ion mobility peak that corresponds to the target ion of interest).

In these embodiments, the width of the ion mobility drift time range may be less than the width of the ion mobility peak that corresponds to the target ion of interest by any suitable amount. According to various embodiments, the width of the ion mobility drift time range may be around (i) 90% or less; (ii) 80% or less; (iii) 70% or less; (iv) 60% or less; or (v) 50% or less, of the width of the ion mobility peak that corresponds to the target ion of interest.

Thus, the ion mobility separator may be operated such that ions having ion mobility drift times within a desired ion mobility drift time range (which range may be (approximately) centred on the ion mobility drift time of the target ion) are isolated (selected). The effect of this will be to (further) "purify" the ions so that the relative proportion of ions corresponding to the target ion of interest is increased.

Ions having ion mobility drift times outside of the desired ion mobility drift time range may, for example, be discarded. Additionally or alternatively, some or all of the other second ions may themselves be isolated (for example stored in an ion trap), further processed and/or analysed.

The third ions may be isolated from other ions of the second ions, for example by storing the third ions in an ion trap and then, for example, discarding the other second ions (or otherwise). In these embodiments, any suitable ion trap may be provided and used, such as for example the ion trap or store described further below. The ion trap or store may be located upstream from the ion mobility separator. Thus, isolating the third ions of the second ions may comprise passing the third ions from the separator (upstream) to the ion trap or store.

Alternatively, the ion trap or store may be located downstream from the ion mobility separator. Thus, isolating the third ions of the second ions may comprise passing the third ions from the separator (downstream) to the ion trap or store.

In various embodiments, the third ions are stored in the same ion trap that was used to store the first and/or second ions. However, it would be possible to use a third different ion trap to store the third ions, if desired.

According to various embodiments, the isolated third ions may optionally be separated according to their ion mobility. All or most of the third ions may be separated according to their ion mobility. Where the isolated third ions are stored in an ion trap, separating the third ions according to their ion mobility may comprise passing the third ions from the ion trap (downstream) into the ion mobility separator (and then separating the third ions).

The third ions may be separated according to their ion mobility in any suitable manner, in embodiments using an ion mobility separator. Any suitable ion mobility separator may be provided and used, for example as described below.

In various embodiments, the third ions are separated using the same ion mobility separator that was used to separate the second and/or first and/or analyte ions. However, it would be possible to use a fourth different ion mobility separator to separate the third ions, if desired.

The third ions should be (and in various embodiments are) separated according to their ion mobility such that second ions having different ion mobilities arrive at an exit region of the ion mobility separator at different times, for example such that ions with relatively high ion mobilities arrive at the exit region ahead of ions with relatively low ion mobilities (or such that ions with relatively low values of ion mobility arrive at the exit region ahead of ions with relatively high values of ion mobility).

Where, as described below, the ion mobility separator comprises a cyclic or closed-loop separator, the third ions may be separated by causing the third ions to make any integer number of cycles of the cyclic or closed-loop separator, such as one or more than one cycles of the separator.

According to various embodiments, one or more further iterations of isolating ions and/or separating the isolated ions according to their ion mobility may be performed, for example in the manner described above. Any number of such additional iterations may be performed, such as one, two, three, four, and so on. The effect of each iteration will be to (further) "purify" the ions so that the relative proportion of ions corresponding to the target ion of interest is increased.

According to various embodiments, the (isolated) second ions or ions derived from the second ions are analysed. All or most of the second ions (or ions derived from all or most of the second ions) may be analysed. Alternatively, only a subset of the second ions (or ions derived from only a subset of the second ions) may be analysed. For example, in various embodiments (as described above), (only) the isolated third ions (or ions derived from the third ions) are analysed.

Analysing the second ions or ions derived from the second ions may comprise detecting the second ions and/or detecting ions derived from the second ions, for example using an ion detector. This may comprise analysing the second ions and/or analysing ions derived from the second ions, for example using a mass analyser, so as to determine their mass to charge ratio.

The mass analyser may comprise any suitable mass analyser, for example as described below. The ion detector may comprise any suitable ion detector, for example as described below.

In these embodiments, the second ions themselves may be analysed. That is, some or all of the isolated second ions may be analysed (by the mass analyser) so as to determine the mass to charge ratio, intensity and/or abundance of the second ions.

According to various other embodiments, ions derived from the second ions may be analysed. That is, some or all ions derived from some or all of the isolated second ions may be analysed (by the mass analyser) so as to determine the mass to charge ratio, intensity and/or abundance of the ions derived from the second ions.

In these embodiments, the ions that are derived from the second ions may be derived from the second ions in any suitable manner. In various particular embodiments, some or all of the isolated second ions may be activated, fragmented or reacted to produce product ions (and the product ions may then be analysed). Where ions are activated, fragmented or reacted to produce product ions, this may be done using an activation, fragmentation, collision or reaction device. The or each activation, fragmentation, collision or reaction device can comprise any suitable such device, for example as described below.

Thus, according to various embodiments, some, most or all of the isolated second ions are activated, fragmented or reacted to produce product ions, and the product ions are analysed so as to produce a product ion spectrum in respect of the target ion of interest. Since the second ions will have been "purified" (so as to increase the relative proportion of ions corresponding to the target ion of interest), in the manner described above, the "purity" of the so-produce product ion spectrum will be increased, thereby simplifying its interpretation.

Figure 2:
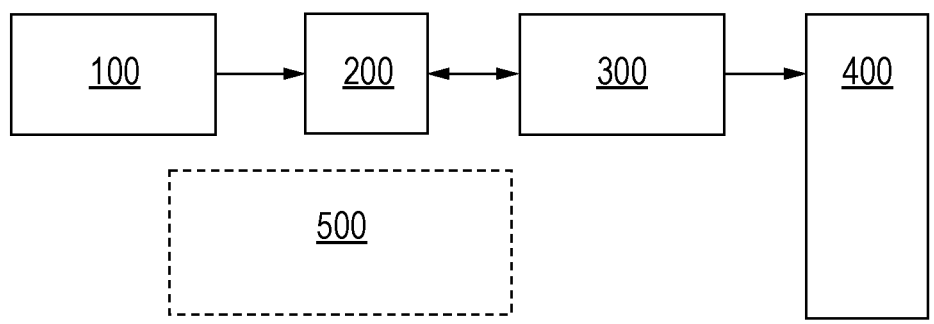
FIG. 2 shows schematically an analytical instrument according to various embodiments.

FIG. 2 shows schematically an analytical instrument such as a mass and/or ion mobility spectrometer that may be operated in accordance with various embodiments. The analytical instrument comprises an optional mass filter 100 such as a quadrupole mass filter, an optional ion store or trap 200, a separator 300 such as an ion mobility separator, and a mass analyser 400.

The mass analyser 400 may be arranged downstream of the ion trap 200 and the ion mobility separator 300. Where present, the mass filter 100 may be arranged upstream of the ion trap 200, the separator 300, and the mass analyser 400.

In the embodiment depicted in FIG. 2, the ion trap 200 is coupled to and arranged upstream of the ion mobility separator 300. However, it would be possible for the ion trap 200 to be arranged in any suitable location relative to the ion mobility separator 300, such as for example downstream of the ion mobility separator 300.

As illustrated by FIG. 2, the analytical instrument may be configured such that ions can be provided by (sent from) the ion trap 200 to the (ion mobility) separator 300, and can be provided by (sent from) the (ion mobility) separator 300 to the ion trap 200. This allows separated ions to be stored (trapped), and subsequently separated. This means that ions can be separated multiple times.

It would also be possible, for example, for the analytical instrument to comprise a second separator such as a second ion mobility separator, that may be provided upstream from the ion trap 200 (and downstream from the mass filter 100). This would again allow separated ions to be stored (trapped), and subsequently separated.

Figure 3:
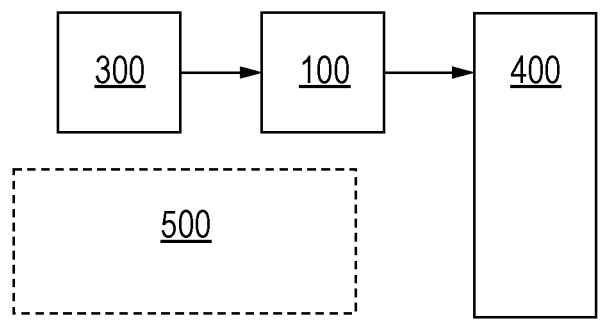
FIG. 3 shows schematically an analytical instrument according to various embodiments.

FIG. 3 shows schematically another analytical instrument such as a mass and/or ion mobility spectrometer that may be operated in accordance with various embodiments. The analytical instrument comprises a separator 300 such as an ion mobility separator, a mass filter 100 such as a quadrupole mass filter, and a mass analyser 400. The mass filter may be arranged downstream of the separator 300, and the mass analyser 400 may be arranged downstream of the ion mobility separator 300. As illustrated by FIG. 3, the analytical instrument may be configured such that ions can be provided by (sent from) the separator 300 to the mass filter 100, and can be provided by (sent from) the mass filter 100 to the mass analyser 400.

In various embodiments, the mass analyser 400 may comprise an orthogonal acceleration Time of Flight mass analyser. However, more generally the mass analyser may comprise any suitable mass analyser such as a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

It should be noted that FIGS. 2 and 3 are merely schematic, and that the analytical instrument may (and in various embodiments does) include other components, devices and functional elements to those shown in FIGS. 2 and 3.

For example, in various embodiments, the analytical instrument comprises an ion source (not shown) configured to generate the analyte ions.

The ion source may comprise any suitable ion source such as an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; (xxx) a Low Temperature Plasma ("LTP") ion source; and (xxxi) a Helium Plasma Ionisation ("HePI") ion source.

The analytical instrument may comprise a chromatography or other separation device upstream of (and coupled to)

the ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The analytical instrument comprises an activation, collision, fragmentation or reaction device (not shown) configured to activate, fragment or react ions.

The activation, collision, fragmentation or reaction device may comprise any suitable such device. The analytical instrument may comprise one or more activation, collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The analytical instrument may comprise any one or more further devices, as desired. For example, in various embodiments, the analytical instrument may comprise one or more ion guides, one or more ion traps, and/or one or more mass filters, for example which may be selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

As shown in FIGS. 2 and 3, the analytical instrument may comprise a control system 500, that may be configured to control the operation of the analytical instrument, for example in the manner of the various embodiments described herein. The control system may comprise suitable control circuitry that is configured to cause the instrument to operate in the manner of the various embodiments described herein. The control system may comprise suitable processing circuitry configured to perform any one or more or all of the necessary processing and/or post-processing operations in respect of the various embodiments described herein. In various embodiments, the control system may comprise a suitable computing device, a microprocessor system, a programmable FPGA (field programmable gate array), and the like.

The analytical instrument may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

The (or each) separator 300 may comprise any suitable ion mobility separator that is configured to separate ions according to their ion mobility. The (or each) ion mobility separator 300 may comprise a drift tube, that may be pressurised with gas. An electric field, for example comprising a DC voltage gradient and/or a travelling DC voltage wave, may be arranged to urge ions along the length of the ion mobility separator 300, that is through the gas, so that ions separate according to their ion mobility. The ions may optionally be urged against a counter flow of gas. Alternatively, a gas flow may be arranged to urge ions along the length of the ion mobility separator 300, while an electric field, for example comprising a DC voltage gradient and/or a travelling DC voltage wave, may be arranged to oppose the gas flow so that ions separate according to their ion mobility.

The (or each) ion mobility separator 300 may operate in-line with the ion optical path of the analytical instrument (for example mass spectrometer).

However, various embodiments are particularly, although not exclusively, concerned with an ion mobility separation device comprising a closed-loop ion separator. The ion mobility separation device may include any or all of the features of the ion separation devices disclosed in U.S. Pat. No. 9,984,861, entitled "Ion Entry/Exit Device", in the name of Micromass UK Limited, the entire contents of which is incorporated herein by reference. Other examples of a cyclic ion mobility separator system, to which the method disclosed herein are applicable, are described in US 2009/014641 (Micromass), the entire contents of which are herein incorporated by reference.

Thus, in various particular embodiments, the ion mobility separator 300 comprises a cyclic (closed-loop) ion mobility separator. In these embodiments, ions may be caused to separate according to their ion mobility over (for example) a fixed integer number of cycles around the ion mobility separator 300. An ion gate or gate region may be provided which may be closed to allow multi-pass operation. The ion gate may be opened, for example after a predetermined time period, to allow ions to exit the ion mobility separator 300 after ions have made one or more circuits of the ion mobility separator 300. Using a cyclic ion mobility separator can allow a higher degree of separation, and so higher ion mobility resolution.

The ion mobility separation device may be operated in one or more of a plurality of modes of operation. In various embodiments, the modes of operation include at least an ion introduction (injection) mode, an ion separation mode and an ion ejection for data acquisition mode. Optionally the modes may further comprise a bypass mode in which ions bypass the separator of the ion mobility separation device. In this mode, the ions may pass through the ion mobility separation device without undergoing separation.

In various embodiments the ion mobility separation device further comprises at least one ion store 200 for storing ions before and/or after passing through the separator. The or each ion store 200 may be located immediately adjacent the separator.

In some embodiments first and second ion stores are provided, which may be located one on either side of the separator. In embodiments the first and second stores are for storing ions which have passed through the separator. In some embodiments ions enter or leave the or each ion store along a path which is orthogonal to a direction of travel of ions along the separator of the ion mobility separation device. Such a store may enable ions to be temporarily stored before or after passing through the separator, before being reintroduced to the separator at a later time, or being ejected for detection.

This functionality may enable certain ions having a particular range of mobility to be separated out (isolated) from a sample of ions. Such ions may be selected by selecting the timing of the applicable instance of a mode appropriately. The stored ions may be the desired ions, such that they are subsequently ejected for data acquisition, optionally after further separation, or they may be the ions that it is desired to discard, such that they are ejected from the store so as to be discarded from further processing.

The or each ion store may comprise a collision, fragmentation or reaction device, and when in a store, ions may be subjected to processing, such as activation or fragmentation.

In embodiments, the or each ion store is local to the separator of the ion separation device. For example, in embodiments, the separator comprises an array of electrodes, and the or each ion store is located immediately adjacent the array.

In embodiments in which the ion mobility separation device comprises at least one store, the modes may further comprise, in respect of one or more of the stores, at least one mode in which ions are introduced to the store, and at least one mode in which ions are ejected from the store. In embodiments, the modes may include a mode in which ions are introduced to the store after passing through the separator, and one or both of a mode in which ions are ejected from the store for detection and a mode in which ions are ejected from the store and reintroduced to the separator.

Yet further modes may be used, for example, to result in processing of stored ions. For example, the modes may include a mode in which ions stored in a store are subjected to at least one of fragmentation, reaction, dissociation and activation.

In embodiments the ion separator comprises is a cyclic separator, that is a closed loop separator. The separator may comprise an ion guide, which may be a closed loop ion guide. The separator (closed-loop ion guide) may start and end with an ion entry/exit device. The ion entry/exit device may be provided by a region of a closed-loop ion guide. Features of embodiments of an ion entry/exit device which may be used in these embodiments are described below.

When the device is operating in a separation mode, ions may be caused to pass around the separator (ion guide) (and, where applicable, through an ion entry/exit device) a plurality of times, and as many times as desired. For example, the ions may pass around the separator (ion guide), and, where applicable, through the ion entry/exit region≥x times, wherein x is 2, 3, 4, 5, 6, 7, 8, 9, 10, 15 or 20.

In some embodiment the ion mobility separation device comprises an ion entry/exit device, and controlling the operation of the ion mobility separation device may comprise controlling the ion entry/exit device to implement a given function of the ion mobility separation device. The ion mobility separation device may comprise an ion entry/exit device having at least two arrays of electrodes. In some embodiments, the modes include a first mode in which DC potentials are successively applied to successive electrodes of at least one of the electrode arrays in a first direction such that a potential barrier moves along the at least one array in the first direction and drives ions into and/or out of the device in the first direction; and a second mode in which DC potentials are successively applied to successive electrodes of at least one of the electrode arrays in a second, different direction such that a potential barrier moves along the at least one array in the second direction and drives ions into and/or out of the device in the second direction.

Ions ejected from the separator may be ejected for detection (and hence data acquisition). In this case, ions may be ejected into an ion guide, ion trap, or ion processing device. The ions may pass through one or more components prior to detection.

Ions will separate according to their ion mobilities as they pass through the separator. Thus, switching between modes of the ion separation device at an appropriate time may be used to cause a desired subset of ions to be ejected from the separator for example for detection, or to an ion store as desired.

Ions ejected out of the ion separator may be ejected into an ion guide, ion store, ion trap, or ion processing device. The selectively ejected ions may be stored, mass analysed, fragmented to form fragment ions, or reacted with ions or molecules to form product ions within an ion store, ion guide, ion trap, or ion processing device. The ion separation device may be switched back to a separation mode once a desired subset of ions have been ejected. The ejected subset of ions may be a subset of ions having a first ion mobility, or first range of ion mobilities. Other ions having a second ion mobility, or second range of ion mobilities may be allowed to continue to pass through the separator. The method may comprise reintroducing the selectively ejected ions, fragment ions or product ions into the ion entry/exit device whilst operating the device in the second mode such that the reintroduced ions pass into the second ion guide again.

FIGS. 4-13 illustrate in more detail a particular example of an ion mobility separator (IMS) device to which the methods described herein may be applied. The embodiments of the IMS device shown in FIGS. 4-13 are as described in U.S. Pat. No. 9,984,861 (Micromass), previously incorporated herein by reference. It will be appreciated that the methods described herein are not limited to use with this type of IMS device. For example, the IMS device need not be a closed loop IMS device. If the IMS device is a closed loop device, it need not be of the construction described in U.S. Pat. No. 9,984,861 for example including the particular ion exit/entry device. Other types of cyclic IMS device are described in the aforementioned US 2009/014641 (Micromass), which is herein incorporated by reference, and in US 2007/0076926 (Micromass), the entire contents of which is incorporated herein by reference. US 2017/0076926 (Micromass) describes techniques for performing mass spectrometry on ions eluting from an IMS device.

It should be noted that FIGS. 4-13 are merely schematic, not necessarily to scale, and that the separator may (and in various embodiments does) include other components, devices and functional elements to those shown in FIGS. 4-13.

Figure 4A:
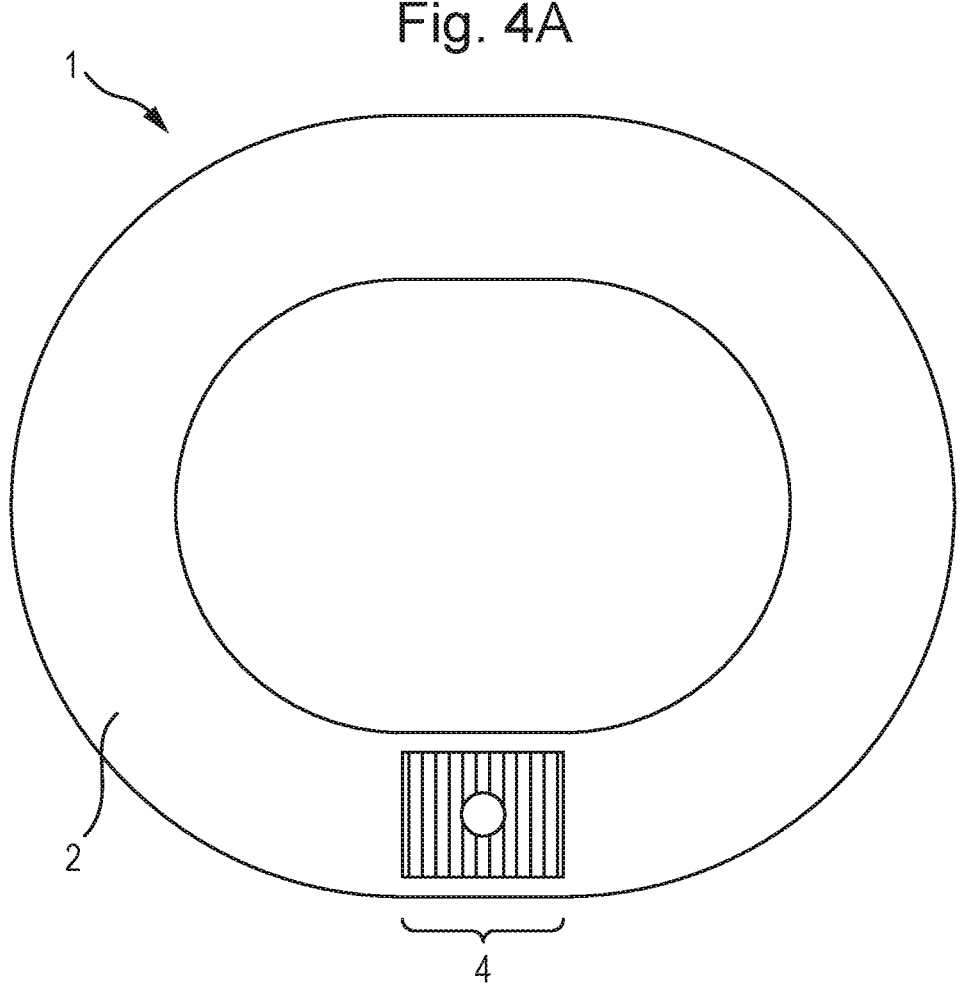
FIG. 4A shows schematically a front view of an ion mobility separator (IMS) device according to an embodiment.

FIG. 4A shows a front schematic view of an ion mobility separator (IMS) device according to embodiments. The IMS device 1 comprises a closed-loop drift cell 2 around which the ions are guided in use. The drift cell 2 comprises a plurality of electrodes that act to confine the ions to an axial path that extends around the closed-loop drift cell 2. The drift cell 2 also comprises electrodes that urge the ions along the axial length of the drift cell. The ion guide is filled with a background gas such that as the ions are urged around the drift cell 2 they collide with the gas molecules and separate according to their ion mobilities through the gas. The ions may be urged around the closed-loop drift cell 2 once or multiple times before being extracted through an exit region 4. The ions may be urged around the drift cell 2 by applying one or more electrical potential that travels axially along the drift cell 2, or by a static DC potential gradient that is arranged axially along the drift cell 2.

Figure 4B:
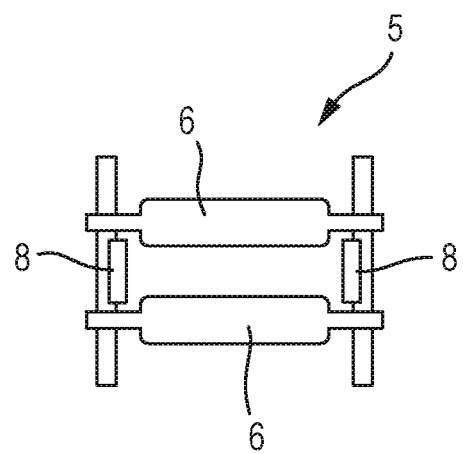
FIG. 4B shows a cross-sectional side view of a portion of the drift cell of the IMS device of FIG. 4A, and FIGS. 4C and 4D show different views of the embodiment of FIG. 4A.

FIG. 4B shows a cross-sectional side view of a portion of the drift cell 2 of the IMS device of FIG. 4A. FIG. 4B shows an embodiment of an electrode unit arrangement 5 that may be used to confine ions to the axis of the ion guiding path in the drift cell 2. At a given point along the axial length of the ion guiding path, the path may be defined between two RF electrodes 6 that are spaced apart in a first direction and two DC electrodes 8 that are spaced in a second, optionally orthogonal, direction. RF voltages are applied to the RF electrodes 6 so as to confine the ions between the RF electrodes 6, in the first direction. DC voltages are applied to the DC electrodes 8 so as to confine the ions between the DC electrodes 8, in the second direction.

The electrode unit 5 is repeated along the axial length of the drift cell 2 such that ions are confined in the drift cell 2 at all points around the ion guide, except when ions are ejected from the ion entry/exit region 4, which will be described further below. The electrode units 5 are axially spaced along the ion guiding path and one of more DC potential may be successively applied to successive electrode units 5 such that a travelling DC potential travels around the drift cell 2 and hence forces the ions around the drift cell. Alternatively, different DC potentials may be applied to successive electrode units 5 around the ion guide such that a static DC gradient is applied along the axis that forces the ions around the drift cell 2.

The upper and lower sides of the drift cell 2 may be formed from printed circuit boards having the DC or RF electrodes 6,8 arranged thereon. Alternatively, or additionally, the radially inner and outer sides of the drift cell 2 may be formed from printed circuit boards having the RF or DC electrodes 6,8 arranged thereon.

Figure 4C:
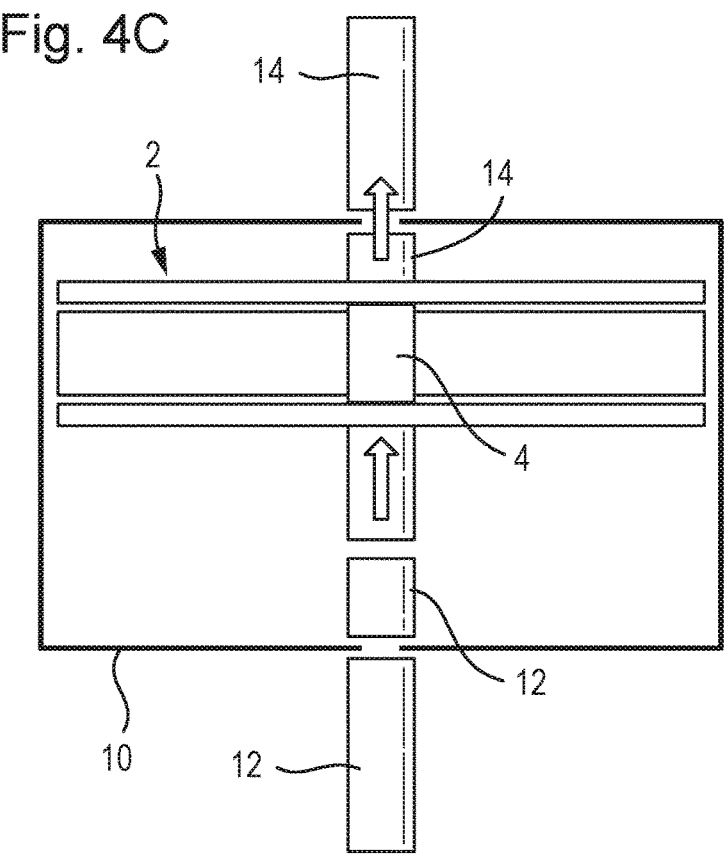
Figure 4D:
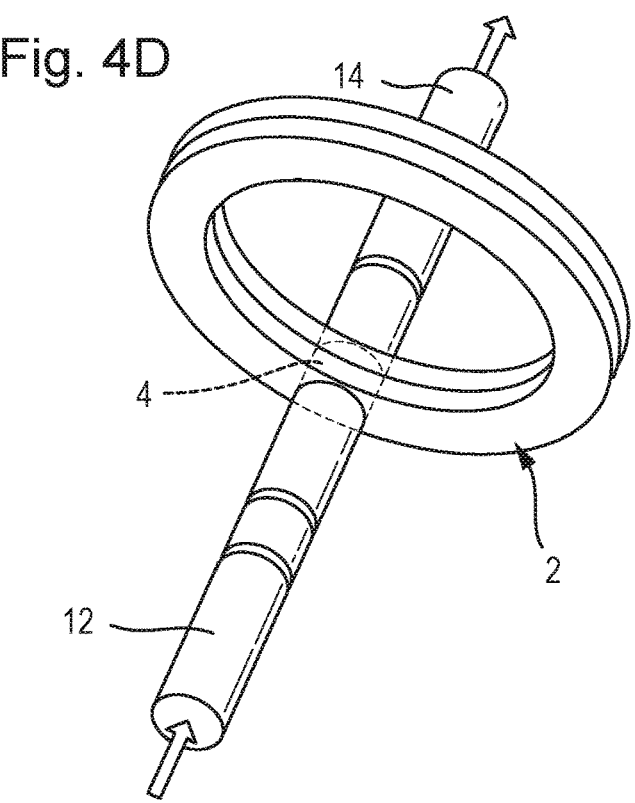

FIG. 4C and FIG. 4D show an orthogonal view and a perspective view of the embodiment of FIG. 4A respectively. The drift cell 2 is arranged inside a chamber 10 that is filled with drift gas. Ions are guided into and out of the chamber 10 using RF ion guides 12,14. The RF ion guides 12,14 are also coupled with the ion entry/exit region 4 of the drift cell 2 such that ions can be guided into the drift cell 2 and out of the drift cell 2. In this embodiment, ions are guided into the chamber 10 and into the entry/exit region 4 of the drift cell 2 by input ion guides 12. If the ions are desired to be separated by their ion mobility then the ions are urged in an orthogonal direction to the ion entry direction and are urged around the oval, circular or racetrack ion path of the drift cell 2 for example when the ion entry/exit device 4, and hence the ion mobility separation device comprising the ion entry/exit device 4 is operated in an ion separation mode. As the ions pass along the ion path they separate according to their ion mobility through the drift gas that is present in the chamber 10 and hence the drift cell 2. When ions are desired to be extracted from the drift cell 2 for example when the ion entry/exit device 4 and hence the ion mobility separation device, is operated in an eject for detection mode, they are ejected in a direction towards the exit RF ion guides 14. The ions are then guided out of the chamber 10 by the exit ion guides 14.

On the other hand, if ion mobility separation of the ions is not required then ion species can be caused to pass from the input ion guide 12 to the output ion guide 14 directly through the entry/exit region 4 of the drift cell 2 and without passing around the drift cell 2. In other words, the ion entry/exit device 4, and hence the ion mobility separation device, may be operated in a by-pass mode.

In embodiments, it is possible to extract ions having a desired range of ions mobilities from the drift cell 2. This is achieved by causing ions to traverse around the drift cell 2 so that they separate and then synchronising the activation of one or more ejection voltages at the ion entry/exit region 4 with the time at which the ions of interest are at the entry/exit region 4. This may be achieved by timing a transition between separation and eject modes appropriately. The desired ions are therefore ejected from the drift cell 2 and the other ion species remaining in the drift cell 2 can continue to pass through the drift cell 2 and separate according to ion mobility. Alternatively, the remaining ions may be discarded from the drift cell 2, for example, by removal of the RF voltages from the electrodes 6 such that the ions are no longer confined within the drift cell 2.

The ejected ions having the desired ion mobilities can be immediately transported away from the drift cell 2 to a detector, optionally first passing through a mass analyser. This may occur if an eject for detection mode is specified. Alternatively, if an eject for storage mode is specified, such ions may be trapped in an ion store whilst the next mobility cycle occurs in the drift cell 2 and until more ions of the same ion mobility range are ejected from the drift cell 2 into the ion store.

Figure 5:
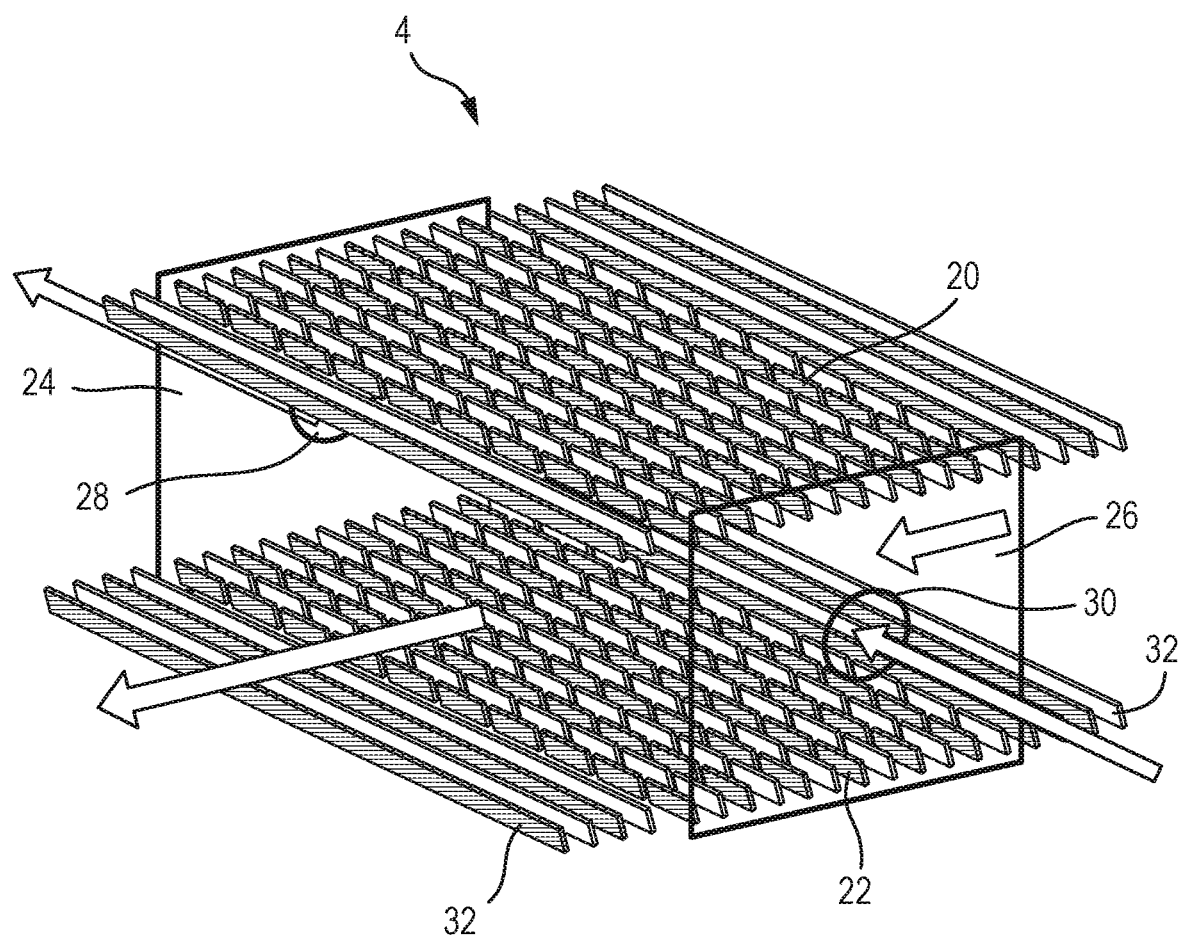
FIG. 5 shows schematically a perspective view of an embodiment of the ion entry/exit device of the drift cell.

FIG. 5 shows a schematic perspective view of an embodiment of the ion entry/exit device 4 of the drift cell 2. The ion entry/exit device 4 comprises two parallel, rectangular arrays of electrodes 20,22 that are spaced apart from each other. Each array of electrodes 20,22 comprises a plurality of electrodes arranged in rows and columns. Various electrical potentials are applied to these electrodes so as to manipulate the ions, as will be described in more detail below. The device has four sides that extend between the four edges of the arrays 20,22. Two of the opposing sides are formed by end plates 24,26, wherein each end plate has an orifice 28,30 therein. One of the end plates 26 has an ion injection orifice 30 for injecting ions into the device 4 from outside of the drift cell 2. The opposing end plate 24 has an ion ejection orifice 28 for ejecting ions out of the device 4 and the drift cell 2. The other two opposing sides are junctions with the drift electrodes 32 of the main drift cell 2. One of the junctions, the entrance junction, allows ions to pass into the device 4 from within another part of the drift cell 2. The other junction, the exit junction, allows ions to pass out of the device 4 and into another part of the drift cell 2.

RF electrical potentials are applied to the electrodes in the arrays of electrodes 20,22 in order to confine ions in the direction between the arrays 20,22. The same phase RF potential may be applied to all of the electrodes in the same column of electrodes (a column extends in the direction between the end plates 24,26 having orifices 28,30). Adjacent columns of electrodes may be maintained at different RF phases, optionally opposite RF phases. However, it is alternatively contemplated that same phase RF potential may be applied to all of the electrodes in the same row (a row extends in the direction parallel to the apertured plates 24,26). Adjacent rows of electrodes may be maintained at different RF phases, optionally opposite RF phases.

It will be seen that the ion entry/exit device 4 has plurality of modes of operation which may be used to implement modes of operation of the IMS device. Each such mode may be used to implement a given function in respect of ions, such that an experiment may be constructed from a sequence of modes of operation of the IMS device with appropriate timings. According to a first mode of operation the device 4 is operated in a manner that injects or loads ions into the device 4 from outside of the drift cell 2. The device 4 may also be operated in another mode that urges ions out of the ion entry/exit device 4 into an adjacent part of the drift cell 2. The device 4 may also be operated in another mode which ejects ions out of the device 4 to a region outside of the drift cell 2. These modes will now be described with reference to FIGS. 6 and 7.

FIG. 6 shows schematically electrical potentials that may be applied to the ion entry/exit device 4 and the adjacent parts of the drift cell 2 on either side of the device 4 during a mode in which ions are injected/loaded into the entry/exit device 4 from outside of the drift cell 2. The array of dark and light vertical bars 30 represent the potentials applied to either or both of the electrode arrays 20,22 in the ion entry/exit device 4. The colours of the vertical bars 30 represent the RF phases applied to the electrodes in the arrays 20,22, for example light coloured vertical bars represent one RF phase and dark coloured RF bars represent the opposite RF phase. The vertical heights of the vertical bars 30 represent the magnitudes of the DC voltages applied to the electrodes in the array(s) 20,22. It can be seen that relatively high amplitude DC potentials are applied to all of the electrodes in some of the rows of electrodes, and that relatively low amplitude DC potentials are applied to all of the electrodes in the adjacent rows of electrodes. During the mode in which ions are injected/loaded into the device 4, the DC potentials applied to the electrodes in the arrays 20,22 are varied with time such that the high DC voltages are successively applied to successive rows of electrodes in a direction from the ion injection orifice 30 towards the ion ejection orifice 28, and such that DC potential barriers travel in the direction from the ion injection orifice 30 towards the ion ejection orifice 28. Simultaneously, the low DC voltages are successively applied to successive rows of electrodes in a direction from the ion injection orifice 30 towards the ion ejection orifice 28. This causes ions to be forced into the ion entry/exit device 4 by the high amplitude DC voltages, wherein the ions travel in the regions of low DC voltages. The end plate having the exit orifice 28 may be maintained at a DC or RF potential such that ions are prevented from exiting the ion entry/exit device 4 during loading/injection of ions. Alternatively, or additionally, the amplitude of the high DC potentials may decrease as they travel in the direction towards the exit orifice 28. Alternatively, or additionally, a row of electrodes proximal to the exit orifice 28 may be maintained at high DC potentials so that the ions cannot be forced past this row and out of the ion entry/exit device 4 during loading.

The horizontally elongated bars 32 in FIG. 6 represent the potentials of electrodes in regions of the drift cell 2 that are adjacent to the ion entry/exit device 4. The colours of these horizontal bars represent the RF phases applied to the electrodes, for example light-coloured bars represent one RF phase and dark-coloured bars represent the opposite RF phase. The vertical heights at which the horizontally elongated bars 32 are located represent the magnitudes of the DC voltages applied to the electrodes. As can be seen, most of the horizontally elongated bars 32 are at a relatively low DC potential, but some of these bars are at a higher DC potential. These higher DC potentials are successively applied to successive electrodes along the axial length of the drift cell 2 so that a DC potential barrier travels along the axial length of the drift cell 2 and drives ions around the drift cell 2, which will be described in more detail in relation to FIG. 7. The aperture plates 24, 26 may have high and low DC voltages applied, respectively.

Referring again to FIG. 6, the vertical heights at which the upper surfaces of the horizontally elongated bars 32 are located represent the magnitudes of the DC voltages applied to the electrodes. It can be seen that the magnitude of the low DC potentials applied to the electrode arrays 20,22 during ion loading/injection is smaller than the DC potentials at which the axially adjacent regions of the drift cell 2 is maintained. As such, the ions are prevented from passing from the ion entry/exit region 4 into the adjacent regions of the drift cell 2 during the ion loading/injection mode. This may implement an ion introduction/injection mode of the IMS device.

Once the ions have been loaded/injected into the ion entry/exit device 4, all of the electrodes in the array 20,22 may be maintained at the relatively low DC potential, that is, there is no longer a need to drive ions in the direction between the end plates 24,26 having the orifices 28,30 and so the high DC potentials may be replaced by low DC potentials. The two end plates 24,26 may be maintained at DC or RF potentials that prevent ions from exiting through the end plates 24,26. The DC potentials applied to the end plates 24, 26 may match the DC potential of the electrode 8. The DC potentials applied to the electrodes in the arrays 20,22 may then be increased to the same value as the low DC potentials of the axially adjacent regions of the drift cell 2. There is then no DC barrier between the ion entry/exit region 4 and the axially adjacent portions of the drift cell 2. As such, ions may then pass easily from the ion entry/exit device 4 into the adjacent portion of the drift cell 2 so as to be separated according to their ion mobilities, as will be described with reference to FIG. 7. This may implement a separation mode of the IMS device.

FIG. 7 shows the electrical potentials that are applied to the ion entry/exit device 4 and the axially adjacent parts of the drift cell 2 during a mode in which ions are driven out of the ion entry/exit region 4 and into the adjacent part of the drift cell 2. As described above, after ions have been loaded/injected into the ion entry/exit device 4 the DC potentials applied to the arrays of electrodes 20,22 are raised to correspond to the DC potentials of the adjacent parts of the drift cell 2. As such, there is no longer a DC barrier between the ion entry/exit device 4 and the adjacent parts of the drift cell. As shown in FIG. 7, the DC potentials applied to two columns of electrodes in the electrode arrays 20,22 are then increased to high DC voltages relative to the other electrodes in the arrays 20,22. These high DC voltages are successively applied to successive columns in the arrays 20,22 such that the high DC voltages move along the arrays in the axial direction of the drift cell 2, as indicated by the arrow in FIG. 7. This causes the ions to be driven out of the ion entry/exit device 4 and through the exit junction. The ions then pass into the axially adjacent portion of the drift region 2. The high DC voltages that drove the ions out of the ion entry/exit device 4 may then be successively applied to successive electrodes along the axial length of the remainder of the drift region 2 so as to continuously drive the ions around the entire drift region 2. Examples of such voltages are shown by the relatively high horizontally elongated bars in FIG. 7.

The ions are driven around the closed-loop drift cell 2 by the travelling DC voltages and back into the ion entry/exit device 4 through the entrance junction. The ions may be ejected from the drift cell 2 at this point, as will be described in more detail below. Alternatively, the ions may again be driven through the ion entry/exit device 4 by applying the travelling DC potentials to the columns of electrodes in the electrode arrays 20,22 and then driven around the drift cell 2 by the travelling DC potentials applied to the remainder of the drift cell electrodes. The ions may be driven around the drift cell 4 by this process as many times as is desired, until the ions have separated according to their ion mobility as desired. In this mode, the translation of the high DC potentials that drive ions through the ion entry/exit device 4 and into the axially adjacent part of the drift region 2 is optionally synchronised with the translation of the high DC potentials around the rest of the drift region. As such, the ion entry/exit region 4 is substantially ion-optically identical to the remainder of the drift region 2 during the mode of operation in which the ions are translated around the closed-loop drift cell a plurality of times.

When it is desired to eject ions from the drift cell, the DC potentials applied to the arrays of electrodes 20,22 in the ion entry/exit region 4 may be lowered again relative to the adjacent parts of the drift cell 2 as shown in FIG. 6. This may implement an ion ejection mode of the IMS device. DC potentials may then be applied to the arrays of electrodes 20,22 so as to drive ions in the direction from the injection orifice 30 of the injection end plate 26 to the ejection orifice 28 of the ejection end plate 24. Aperture plates 24, 26 may have low and high DC voltages applied respectively. This is performed in the same manner as the ion loading/ejection mode of FIG. 6, except that in the ejection mode there is no potential barrier preventing the ions exiting the ion entry/exit device through the ejection orifice 30 of the ejection end plate 26. It will be appreciated that alternatively the ions could be ejected from the ion entry/exit device 4 through the same orifice 30 that they were loaded/injected by translating the high DC potentials in the opposite direction to the loading/injection direction.

The ion entry/exit region 4 may operate in a bypass mode in which ions are not desired to be driven around the closed-loop drift cell 2, and in which the ions are not caused to separate. This mode is the same as that described in relation to FIG. 6, except that the ions simply pass directly from the entrance orifice 30 and out of the exit orifice 28 without being transmitted orthogonally into the axially adjacent portion of the drift cell 2. The aperture plates 24, 26 may both have low DC voltages applied, respectively. This may implement a bypass mode of the IMS device. The ions may be prevented from passing into the axially adjacent portion of the closed-loop drift cell 2 by the DC potentials on the electrodes arrays 20,22 being lower than those of the adjacent parts of the drift cell 2. The ions may or may not be driven through the ion entry/exit region 4 by the high DC potentials described in relation to FIG. 6.

FIG. 8A shows schematically a side view of an embodiment of a spectrometer comprising the IMS device. The spectrometer comprises a drift gas chamber 10, an ion trap 40, a helium cell 42, an ion accumulation cell 44, the IMS device 2, an exit cell 46 and an ion transfer cell 48. Electrode gates 50-58 are arranged between the above described successive components. In particular, an entrance gate 54 is arranged upstream of the ion entry/exit device 4 and an exit gate 56 is arranged downstream of the ion entry/exit device 4. The IMS device 2 corresponds to that shown in FIG. 4C.

FIG. 8B shows a potential energy diagram of the DC potentials applied to the components of the spectrometer in a mode in which ions are being accumulated in the ion entry/exit device 4 of the drift cell 2. Ions are released from the ion trap 40 and are then driven through the helium cell 42 by an axial electric field. The ions then pass through the ion accumulation cell 44 and into the ion entry/exit device 4 through the ion entrance orifice 30 in the entrance end plate 26 described above in relation to FIG. 5. The DC potentials of the electrodes in the electrode arrays 20,22 of the ion entry/exit device 4 are maintained lower than the DC potentials applied to the accumulation cell 44, the entrance gate 54 and the exit gate 56. As such, ions are axially trapped and accumulate in the ion entry/exit device 4. The ions enter the ion entry/exit device 4 through the entrance orifice 30 of the entrance end plate 26 described above in relation to FIG. 5. A travelling DC wave may be applied to the rows of electrodes in the electrode arrays 20,22 in order to urge ions into the ion entry/exit device 4, as described with reference to FIG. 6. The DC potential of the IMS drift cell 2 (excluding the ion entry/exit device 4) is represented by the horizontal line that is parallel and vertically above the line representing the DC voltage applied to the arrays 20,22 of the ion entry/exit device 4. The potential difference represented by the gap between these two lines prevents ions from passing out of the ion entry/exit device 4 and into the axially adjacent parts of the IMS drift cell 2.

Figure 9A:
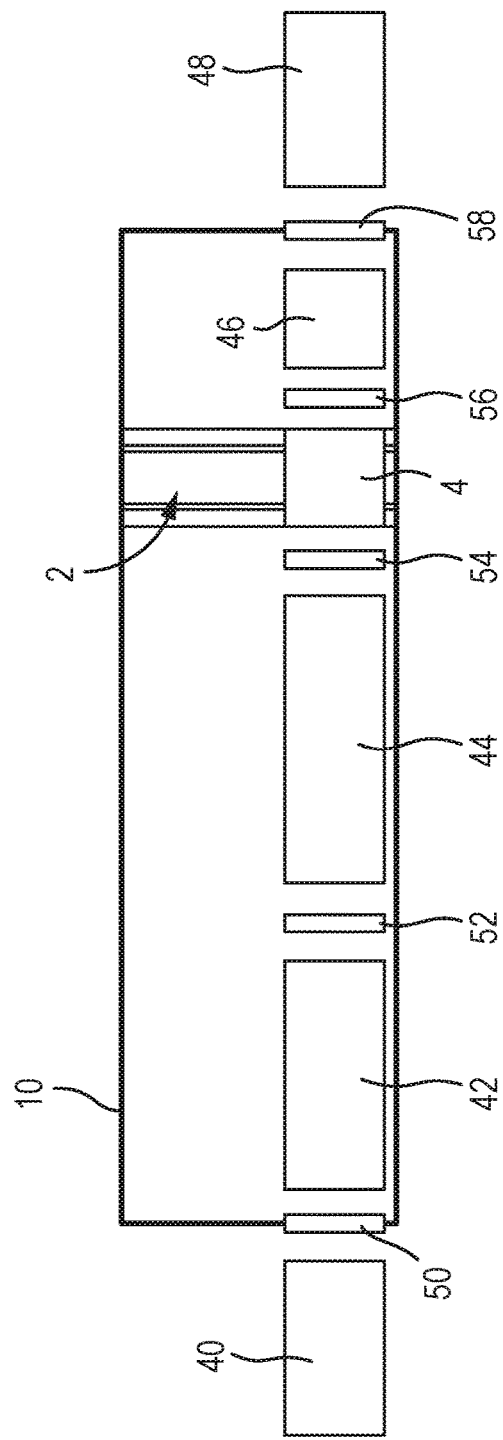
FIGS. 9A and 9B show how the potentials applied to the spectrometer may be altered in preparation for moving ions from the ion entry/exit device into the axially adjacent part of the IMS drift cell.
Figure 9B:
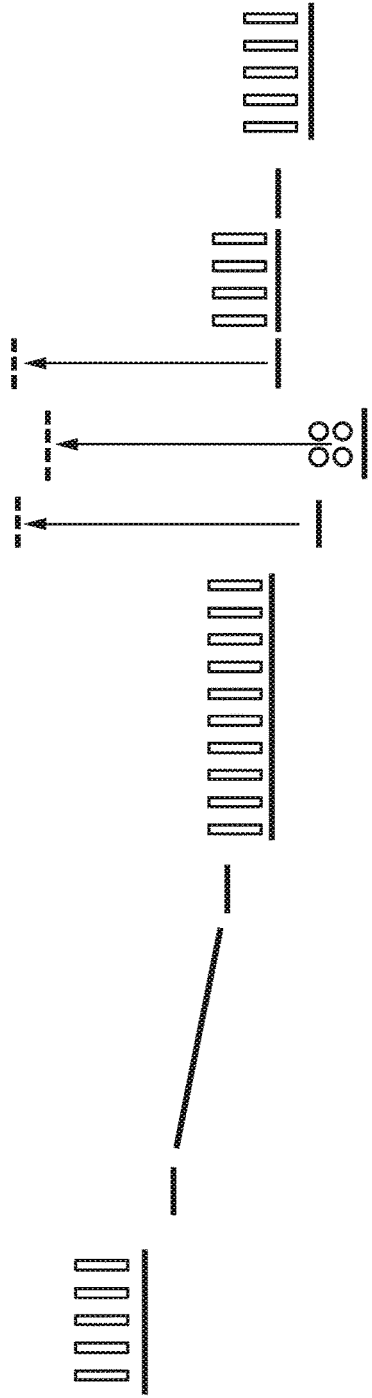

FIGS. 9A and 9B correspond to FIGS. 8A and 8B, except that they show how the potentials applied to the spectrometer are altered in preparation for moving ions from the ion entry/exit device 4 into the axially adjacent part of the IMS drift cell 2. As shown by the arrows in FIG. 9B, the DC potentials of the entrance gate 54, array electrodes 20,22 and exit gate 56 are raised to the DC potentials illustrated by the horizontal dashed lines. The DC potentials applied to the arrays of electrodes 20,22 are then equivalent to the DC potentials applied to the adjacent parts of the IMS drift cell 2, and hence there is no DC barrier preventing ions from passing from the ion entry/exit device 4 into the adjacent part of the IMS drift cell 2.

FIGS. 10A and 10B correspond to FIGS. 9A and 9B, except that they show the potentials at a stage when the ions are driven out of the ion entry/exit device 4 into the adjacent part of the IMS drift cell 2. As described above with reference to FIG. 7, the ions are driven out of the exit aperture 28 in the apertured exit plate 24 by applying DC travelling potentials to the columns of electrodes in the arrays of electrodes 20,22. These travelling potentials are illustrated by the series of parallel horizontal lines 60 in FIG. 10B. The ions are then driven around the drift cell 2 by travelling DC potentials such that the ions separate according to their ion mobilities, as has been described above. When the ions have passed around the drift cell 2 the desired number of times, the ions may be ejected at the ion entry/exit device 4. The length of time the potentials of the electrode arrays 20,22 are in the mode shown in FIG. 10B dictates how many passes the ions of given ion mobility make around drift cell 2. This timing may be based upon a desired path length, and hence resolution, for the ion separation mode of the IMS device.

Figure 11A:
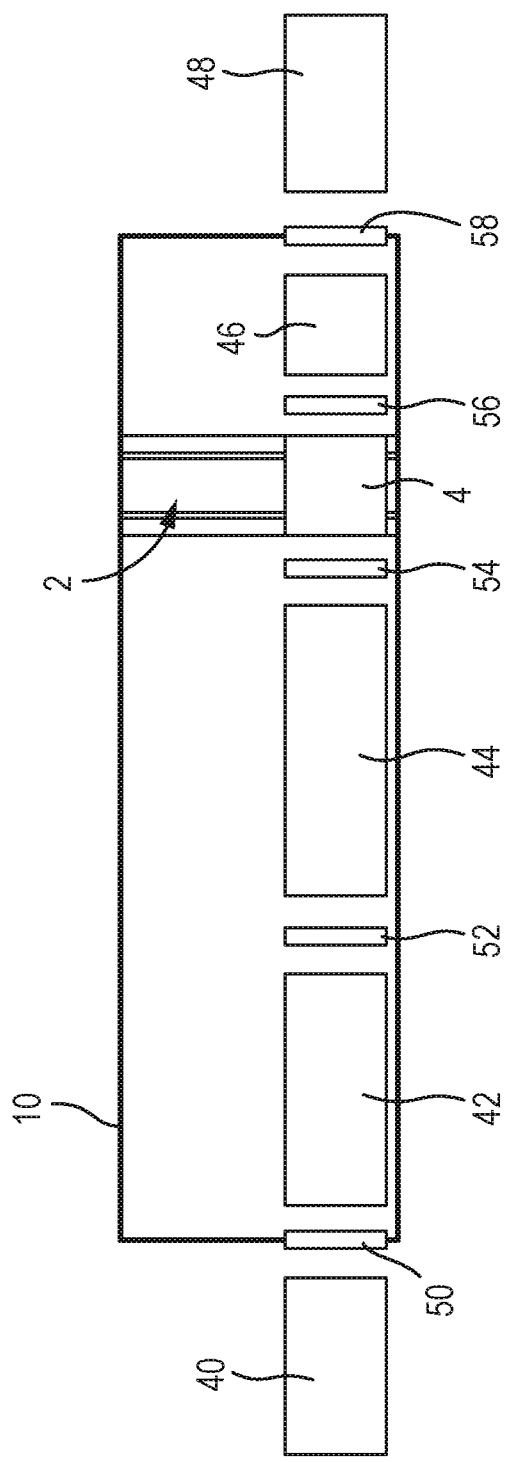
FIGS. 11A and 11B show DC potentials that may be applied to the spectrometer at a stage when the ions are ejected from the drift cell at the ion entry/exit device.
Figure 11B:
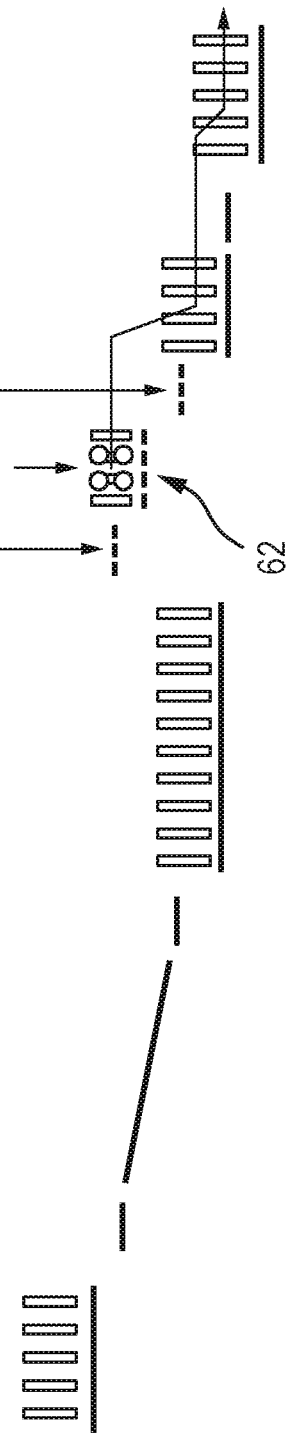

FIGS. 11A and 11B correspond to FIGS. 10A and 10B, except that they show the DC potentials applied to the spectrometer at a stage when the ions are ejected from the drift cell 2 at the ion entry/exit device 4. As shown by the arrows in FIG. 11B, the DC potentials of the entrance gate 54, array electrodes 20,22 and exit gate 56 are lowered to the DC potentials illustrated by the horizontal dashed lines. The DC potentials of the entrance gate 54, array electrodes 20,22, exit gate 56, exit cell 45 and ion transfer cell 48 progressively decrease such that the ions are urged out of the ion entry/exit device 4 and along the spectrometer towards the ion transfer cell 48. The ions leave the ion entry/exit device 4 through the exit orifice 28 of the exit end plate 24 described above in relation to FIG. 5. A travelling DC wave is applied to the rows of electrodes in the electrode arrays 20,22 in order to urge ions out of the exit orifice 28. This is represented by the series of vertical lines 62 in the electrode array region of FIG. 11B.

Figure 12A:
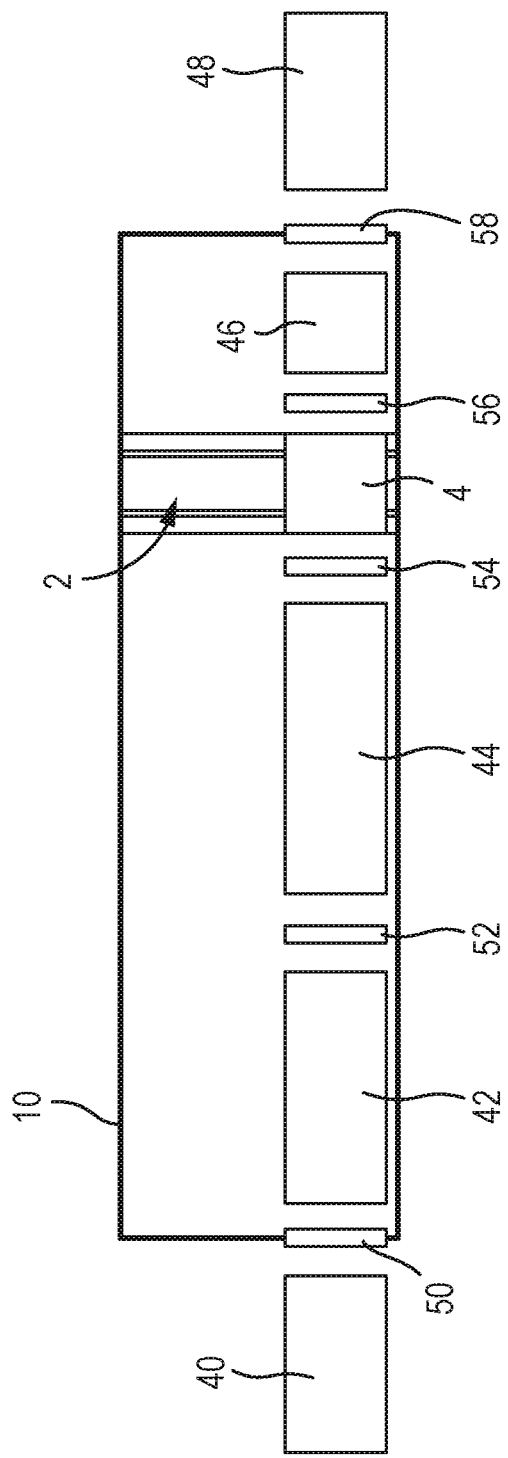
FIGS. 12A and 12B show DC potentials that may be applied to the spectrometer at a stage when the ions are ejected from the drift cell at the ion entry/exit device into a pre-store.
Figure 12B:
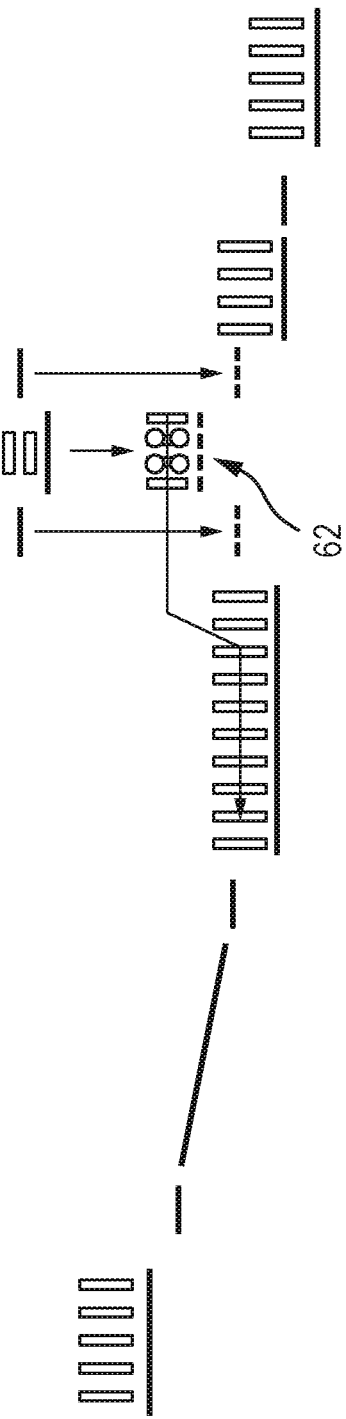

FIGS. 12A and 12B correspond to FIGS. 11A and 11B, except that they show the DC potentials applied to the spectrometer at a stage when the ions are ejected from the drift cell 2 at the ion entry/exit device 4 into the accumulation cell 44. As shown by the arrows in FIG. 12B, the DC potentials of the entrance gate 54, array electrodes 20,22 and exit gate 56 are lowered to the DC potentials illustrated by the horizontal dashed lines. The DC potentials of the exit gate 56, array electrodes 20,22, entrance gate 54, and accumulation cell 44 progressively decrease such that the ions are urged out of the ion entry/exit device 4 and along the spectrometer towards accumulation cell 44. The ions leave the ion entry/exit device 4 through the injection orifice 30 of the entrance plate 22 described above in relation to FIG. 5. A travelling DC wave is applied to the rows of electrodes in the electrode arrays 20,22 in order to urge ions out of the injection orifice 30. This is represented by the series of vertical lines 62 in the electrode array region of FIG. 12B.

Varying the potentials applied to the ion entry/exit device 4 relative to the remainder of the drift cell 2 during loading or ejection of ions at the ion entry/exit device 4 facilitates ion entry and exit from the drift cell 2 without having to alter the potentials of the other components of the spectrometer that are upstream or downstream. This also enables a bypass mode in which ions are not separated in the drift cell 2. For example, the DC potentials of the entrance gate 54, electrode arrays 20,22 and exit gate 56 may be made equivalent to the DC potentials of the accumulation cell 44 and exit cell 46 such that ions pass continuously from the accumulation cell 44, through the ion entry/exit device 4 and into the exit cell 46 without being separated in the drift cell 2.

The travelling DC waves applied to the drift cell 2 outside of the ion entry/exit device 4 may be operated continually during the above modes.

For example, although travelling DC potentials have been described as being used for driving ions around the region of the drift cell 2 outside of the ion entry/exit device 4, static DC gradients may be used instead for this purpose.

It will be appreciated that drift cells 2 having continuous ion guiding paths of shapes other than circular or oval paths are also contemplated as being within the scope of the present disclosure.

The drift cell 2 (or other type of device) need not be a closed-loop device around which ions are guided. For example, the ion entry/exit device 4 could be used in a linear device. The ions may pass along such a non-closed loop device once, or may be reflected along the device multiple times.

The geometry of the electrode arrays 20,22 may be varied and need not be arrays having columns and rows of electrodes.

The direction of the travelling DC potentials in the electrode arrays may be changed or may provide multiple directional travel options.

It will be appreciated that, although not shown in FIGS. 8A to 12B, the IMS device may be coupled to a mass analyser for performing mass spectrometry on ions leaving the device. Such arrangements are shown, for example, in US 2017/0076926 (Micromass), the entire contents of which is incorporated herein by reference. For example, ions may be passed via the transfer cell 48 to a mass analyser of a mass spectrometer, such as a Time of Flight mass analyser.

Figure 13:
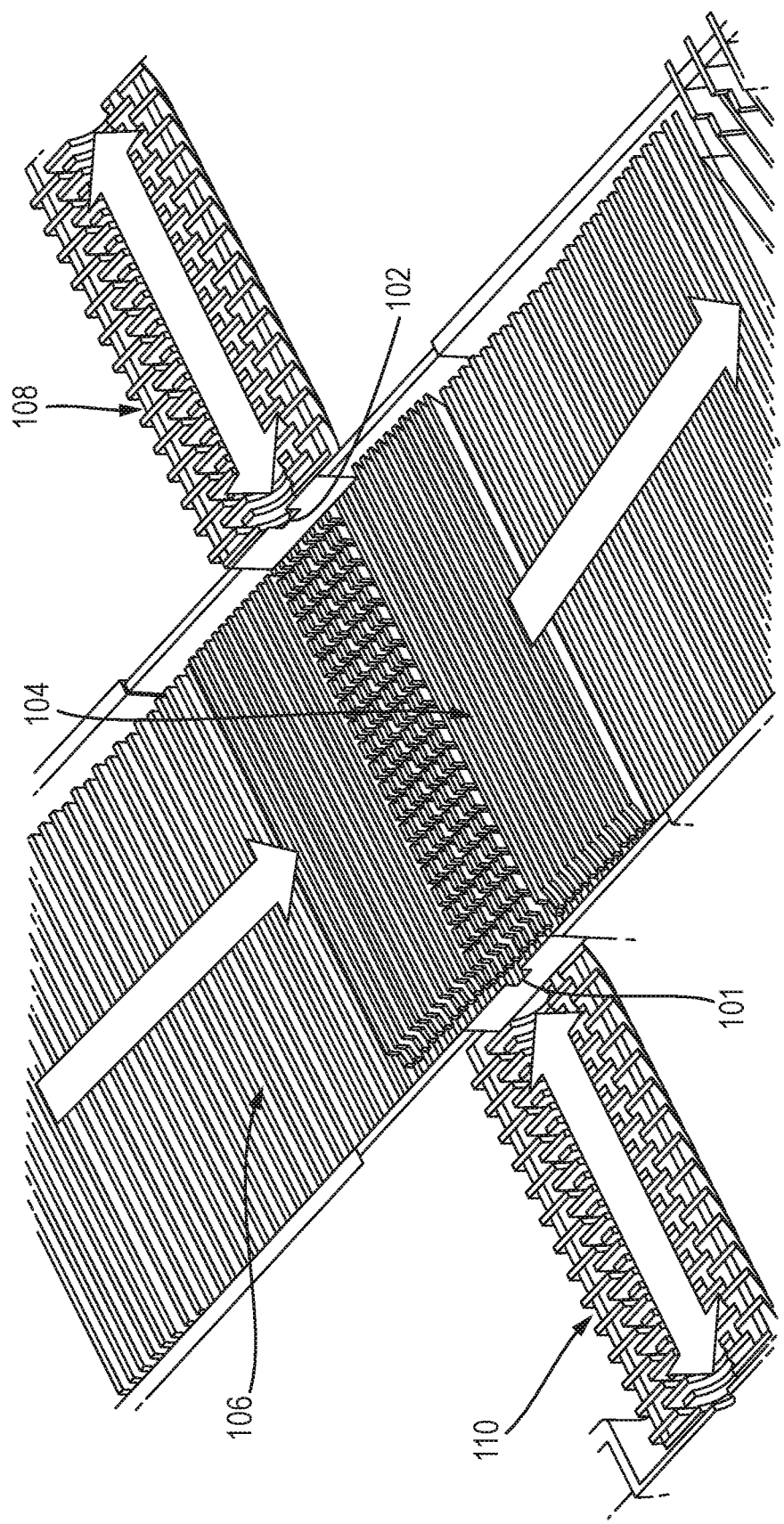
FIG. 13 illustrates an arrangement of stores associated with an array of an ion entry/exit device in embodiments.

Referring to FIG. 13, a detail of an IMS device in the region of the ion entry/exit device is shown. This is similar to the earlier embodiments described, but illustrates in more detail the possible location of ion stores associated with the separator. The IMS device includes an entrance 101 and an exit 102 to a cyclic drift cell 106, and one or more array of electrodes 104 for controlling the movement of ions in the region of the entrance and exit to provide an ion entry/exit device as in the earlier embodiments. In use, ions may travel around the cyclic drift cell in the direction of the arrows extending along the direction of the drift cell. A first ion store 110 is provided on one side of the drift cell 106, and extends in a direction orthogonal to the direction of movement of ions around the drift cell 106. A second ion store 108 is provided on an opposite side of the drift cell 106, again extending in a direction orthogonal to the direction of movement of ions around the drift cell 106. The first and second ion stores may be referred to as pre and post ion stores respectively, based on their position relative to the array 104. The ion entry/exit device may control the movement of ions to enter or leave either of the ion stores at desired times during operation of the IMS device as shown by the arrows superposed on the stores. For example, ions may be caused to enter a respective store when an instance of an "eject to prestore" or "eject to post store" mode is implemented.

As described above, various embodiments are directed to an ion mobility enabled method to improve selectivity and specificity of target analytes, for example in highly complex samples.

Figure 14A:
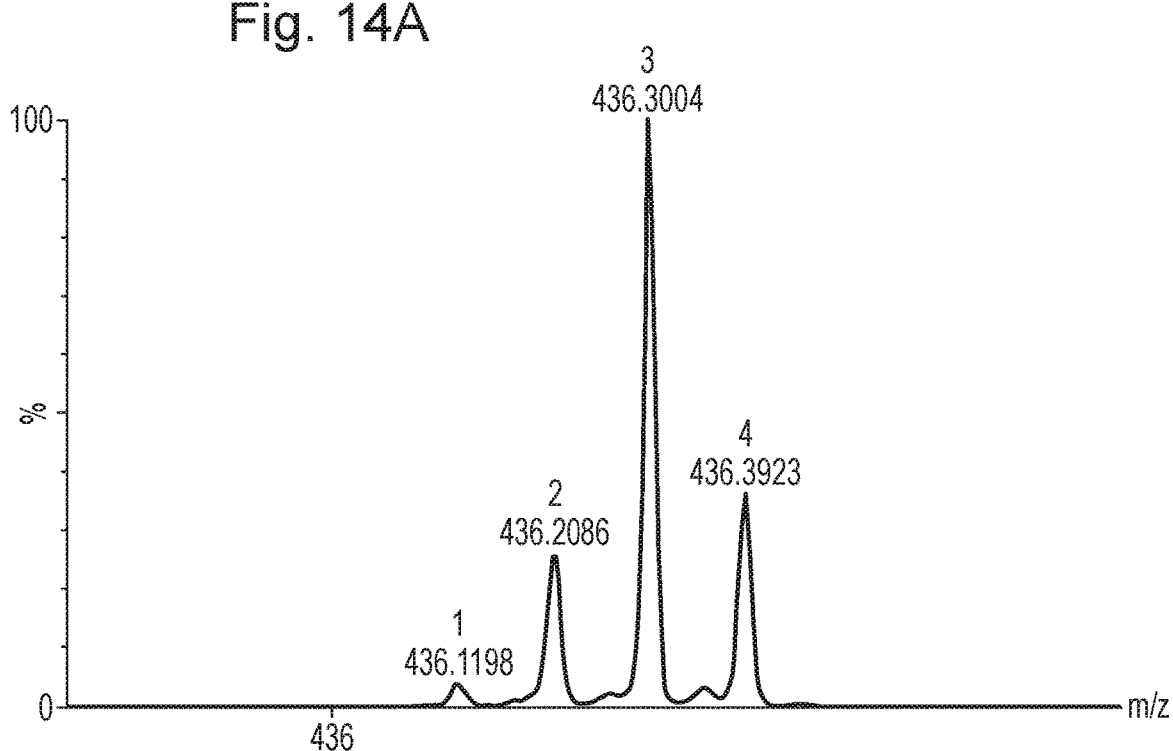
FIG. 14A shows the mass spectrum of FIG. 1A.
Figure 14B:
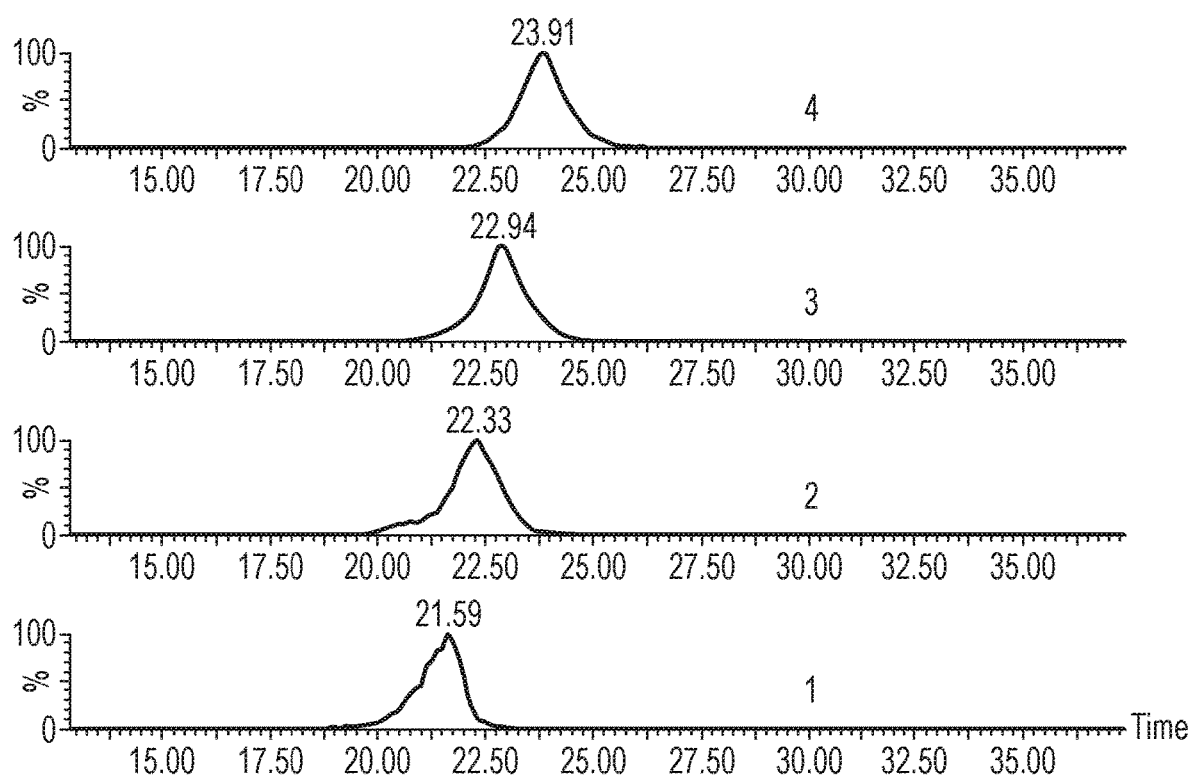
FIG. 14B shows ion mobility spectra for each of the four ion peaks present in the mass spectrum of FIG. 14A.

FIG. 14 shows the mass spectrum of FIG. 1B (FIG. 14A), together with data showing the ion mobility drift time of each of the four ion peaks (peaks 1 to 4) shown in FIG. 1B (FIG. 14B). As can be seen from FIGS. 14A and 14B, each of the ion peaks (peaks 1 to 4) has a different mass to charge ratio, but also a different ion mobility drift time. This means that ion mobility separation can be used to improve selectivity when it is desired to isolate ions corresponding to a particular target ion of interest.

Figure 15:
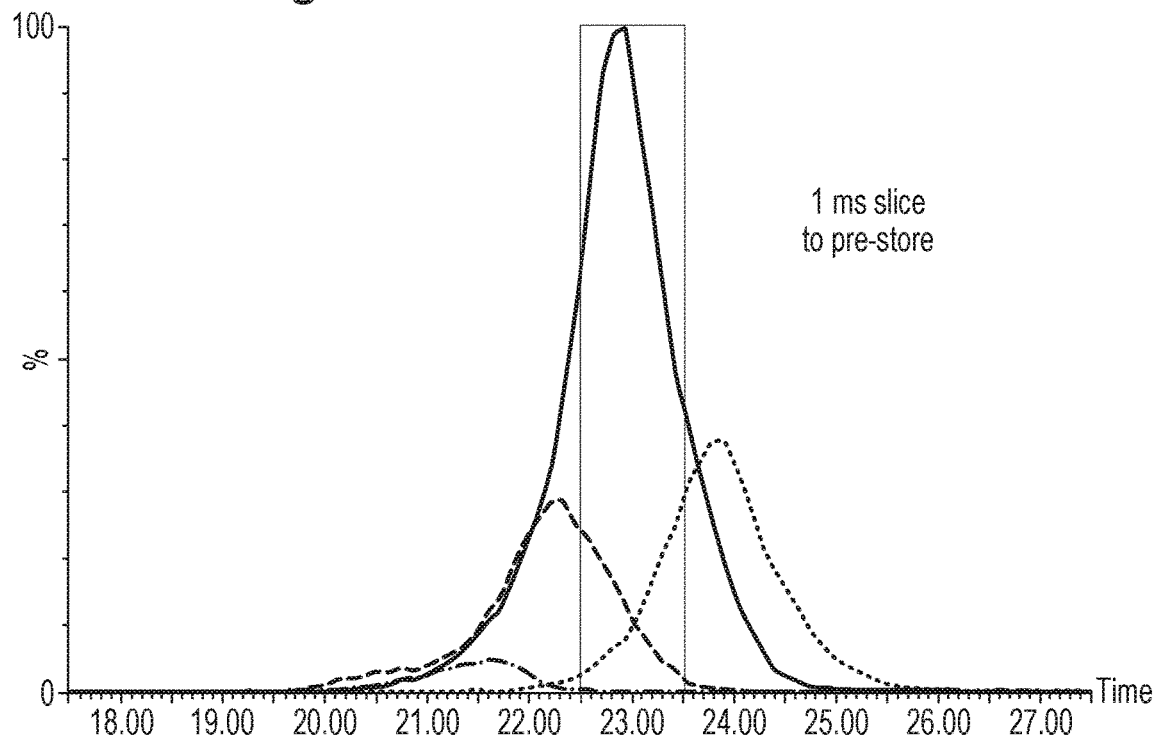
FIG. 15 shows the ion mobility spectra of FIG. 14B in a superimposed manner.

FIG. 15 shows the data of FIG. 14B for each of the four ion peaks superimposed. As can be seen from FIG. 15, by isolating, for example, a 1 ms "slice" of ions from the other ions, the purity of the ions corresponding to ion peak 3 (that is, the relative proportion of ions corresponding to ion peak 3) can be increased.

As can be seen from FIG. 15, the "slice" has a width which is less than the width of the diffusion limited ion mobility peak that corresponds to the target ion of interest. This has the effect of increasing the "purity" of ions that are selected, and means for example, that relatively more of the desired ions (such as ions from peak 3) are selected, as compared to undesired ions (such as ions from peaks 1, 2 and 4).

As described above, according to various embodiments multiple iterations of separating ions according to their ion mobility, and isolating ions that correspond to the target ion of interest are used to improve the purity of the ions. An example of this is illustrated by FIG. 16.

Figure 16:
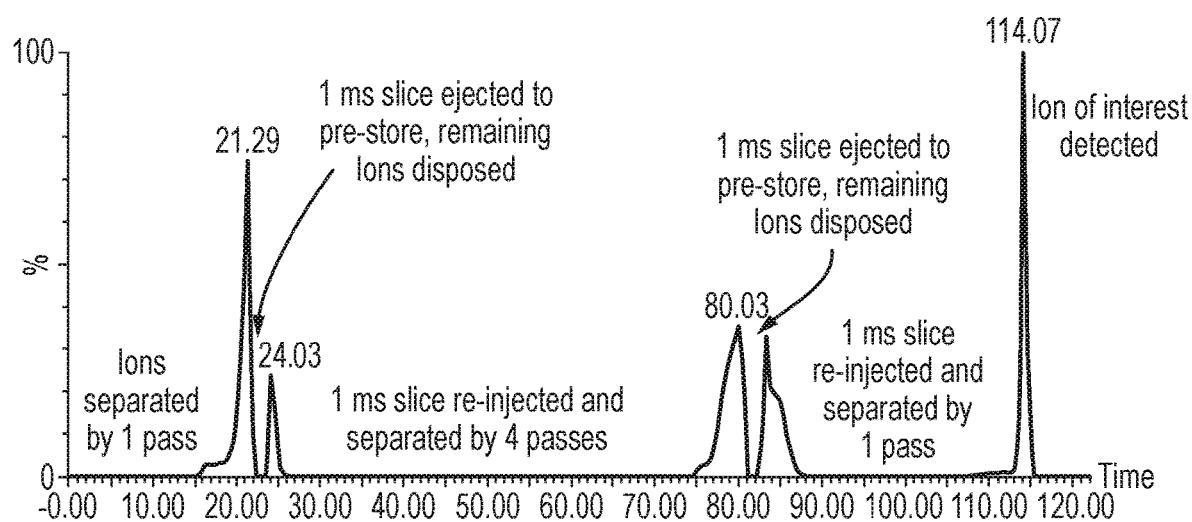
FIG. 16 shows ion mobility data illustrating a method according to various embodiments.

As shown in FIG. 16, a mass filter may be operated to isolate an ion cluster of interest. The ions within the cluster may be separated, for example by using one pass in the cyclic IMS device. A 1 ms slice may be ejected to the pre-store, and the remaining ions may be discarded.

The slice may then be re-injected and separated by, for example, four passes in the cyclic IMS device. A second 1 ms slice may be ejected to the pre-store, and the remaining ions may be discarded.

The slice may then be re-injected and separated, for example by one pass in the cyclic IMS device, and then detected.

The result of this process is improved selectivity of the ion of interest. By using the above described enrichment technique, a significant improvement in target ion selectivity can be achieved.

Figure 17A:
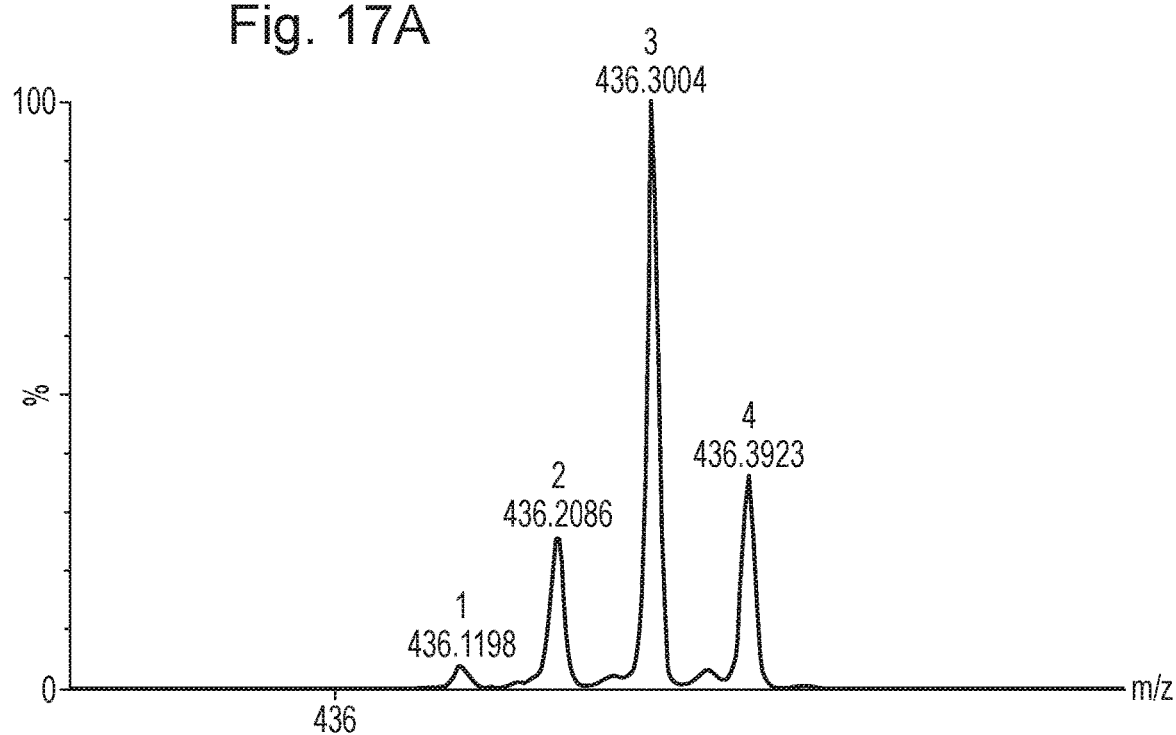
FIG. 17A shows the mass spectrum of FIG. 1A.
Figure 17B:
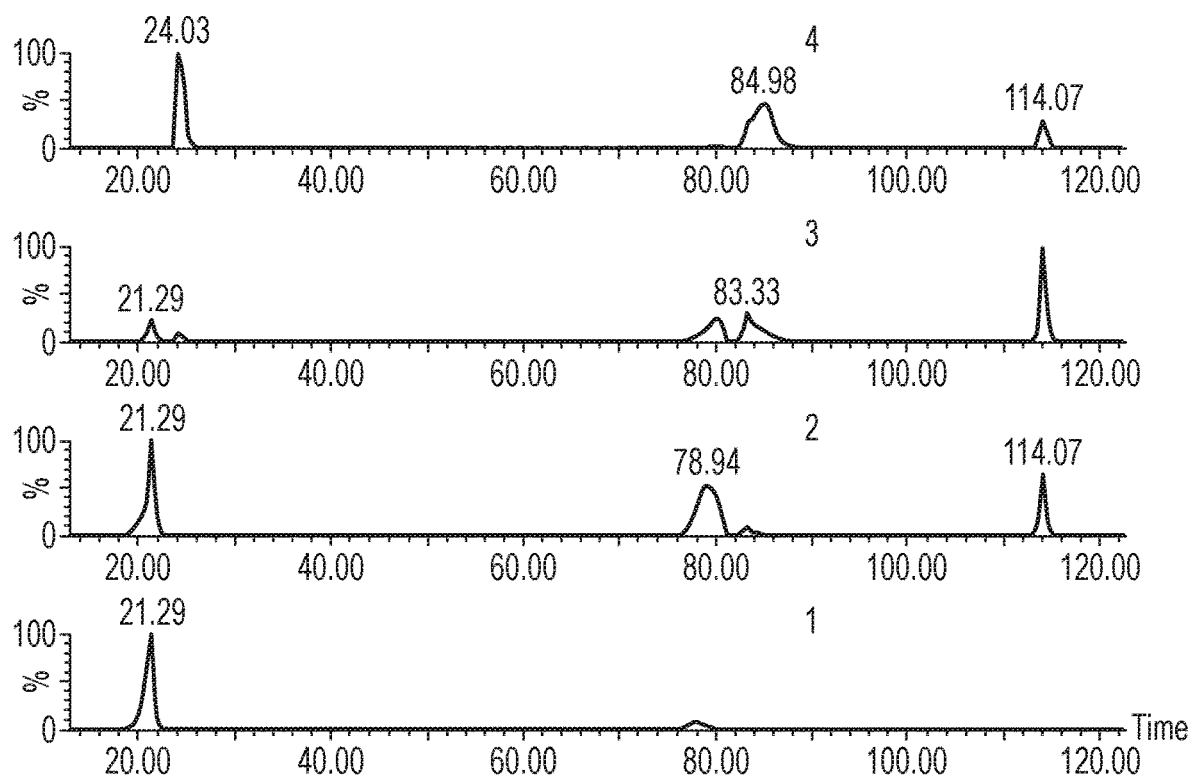
FIG. 17B shows ion mobility data illustrating a method according to various embodiments.
Figure 18:
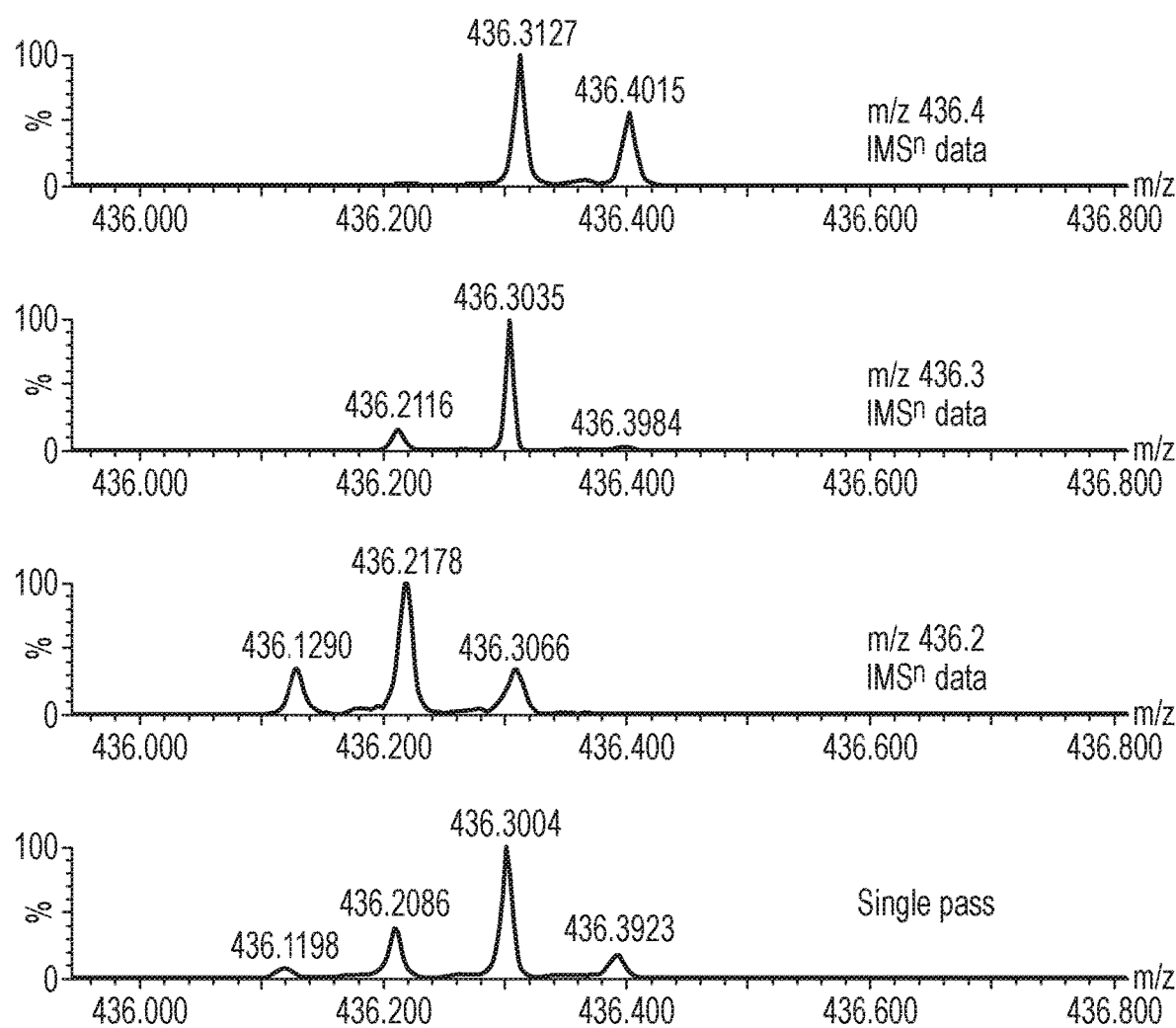
FIG. 18 shows the mass spectrum of FIG. 1A and purified mass spectra for some of the ion peaks present in the mass spectrum of FIG. 1A.

FIGS. 17 and 18 illustrate that it is possible to select any one of the ion peaks 1-4 depicted in FIG. 1B using the techniques according to various embodiments.

FIG. 17 again shows the mass spectrum of FIG. 1B (FIG. 17A), together with data that corresponds to the data of FIG. 16, but in respect of each of the ion peaks (peaks 1 to 4) (FIG. 17B).

FIG. 18 shows the results of the selection process illustrated by FIG. 17B for each of ion peaks 2 to 4. In particular, the bottom panel of FIG. 18 shows the mass spectrum of FIG. 1B, the next panel up shows the resulting mass spectrum after ion peak 2 is selected in accordance with embodiments, the next panel up shows the resulting mass spectrum after ion peak 3 is selected in accordance with embodiments, and the top panel shows the resulting mass spectrum after ion peak 4 is selected in accordance with embodiments.

Figure 19A:
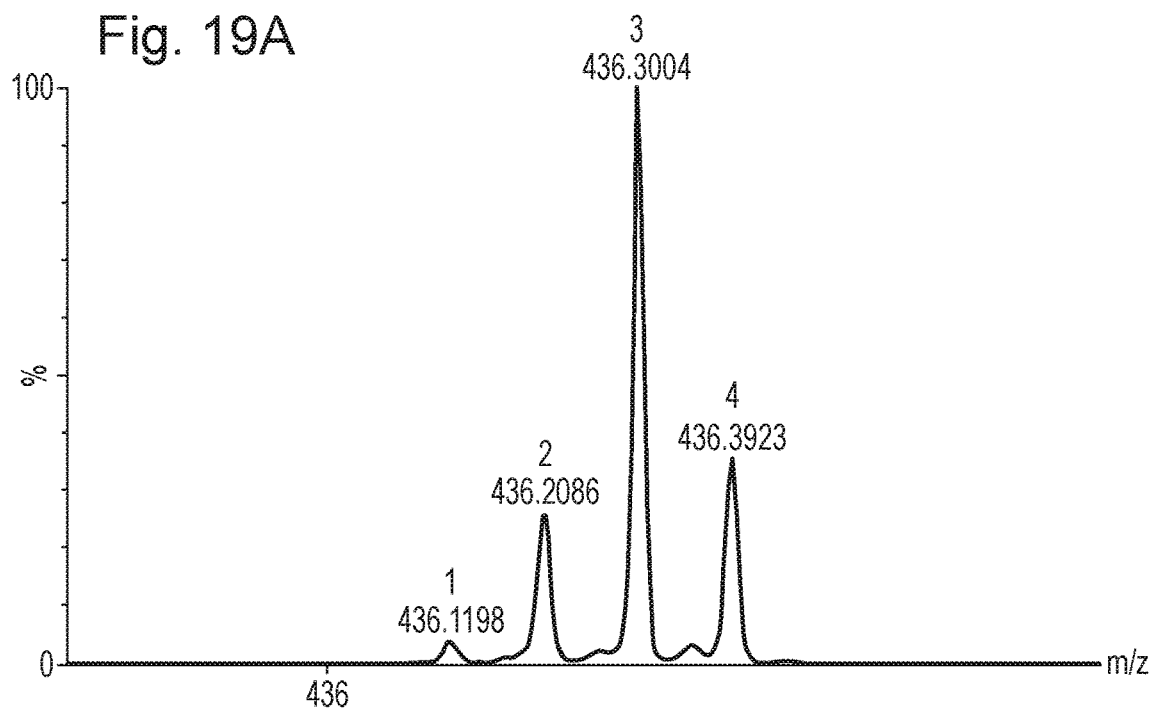
FIG. 19A shows the mass spectrum of FIG. 1A.
Figure 19B:
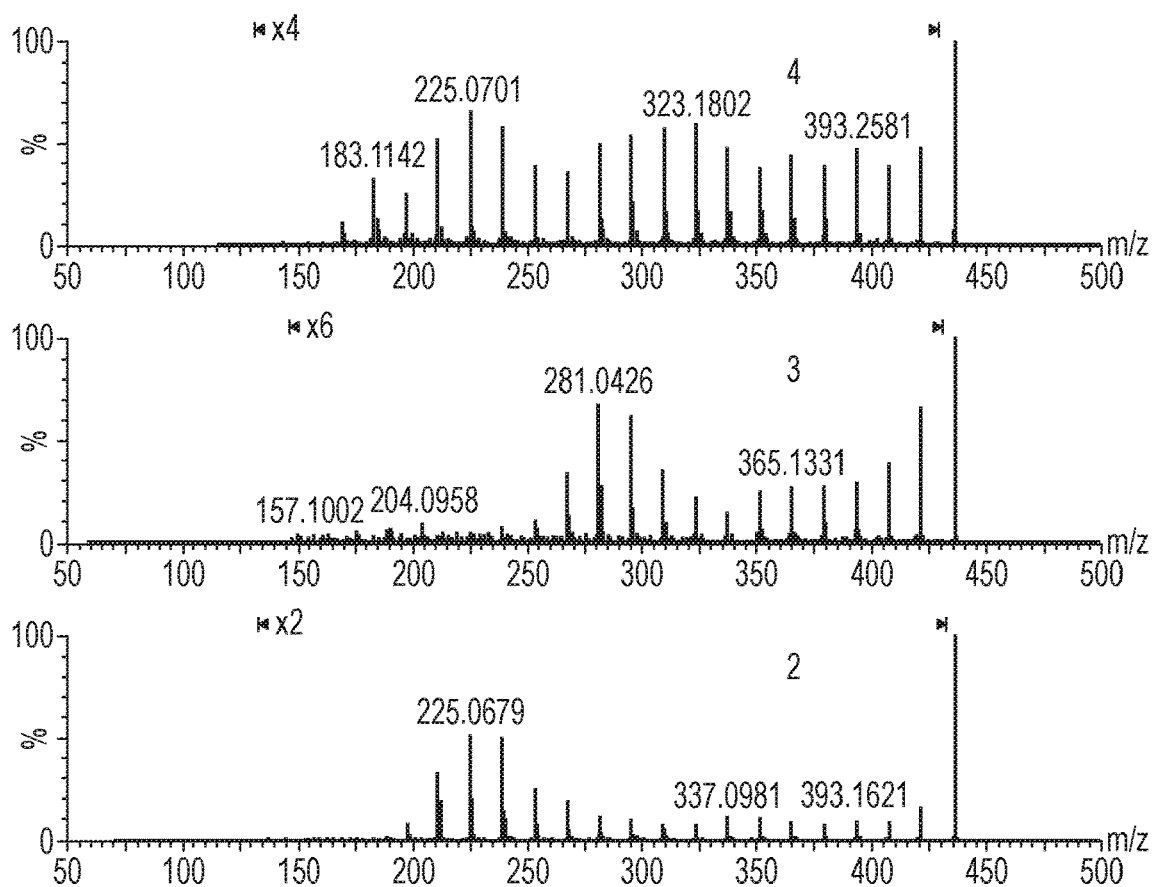
FIG. 19B shows product ion mass spectra for some of the ion peaks present in the mass spectrum of FIG. 19A.

FIG. 19 again shows the mass spectrum of FIG. 1B (FIG. 19A), together with product ion mass spectra for each of ion peaks 2 to 4 (FIG. 19B). As can be seen from FIG. 19B, the product ion mass spectra are different (have different relative abundances) and free from interferences from the other precursor fragment ions, that is are relatively "clean", and can accordingly be interpreted straightforwardly.

Figure 20:
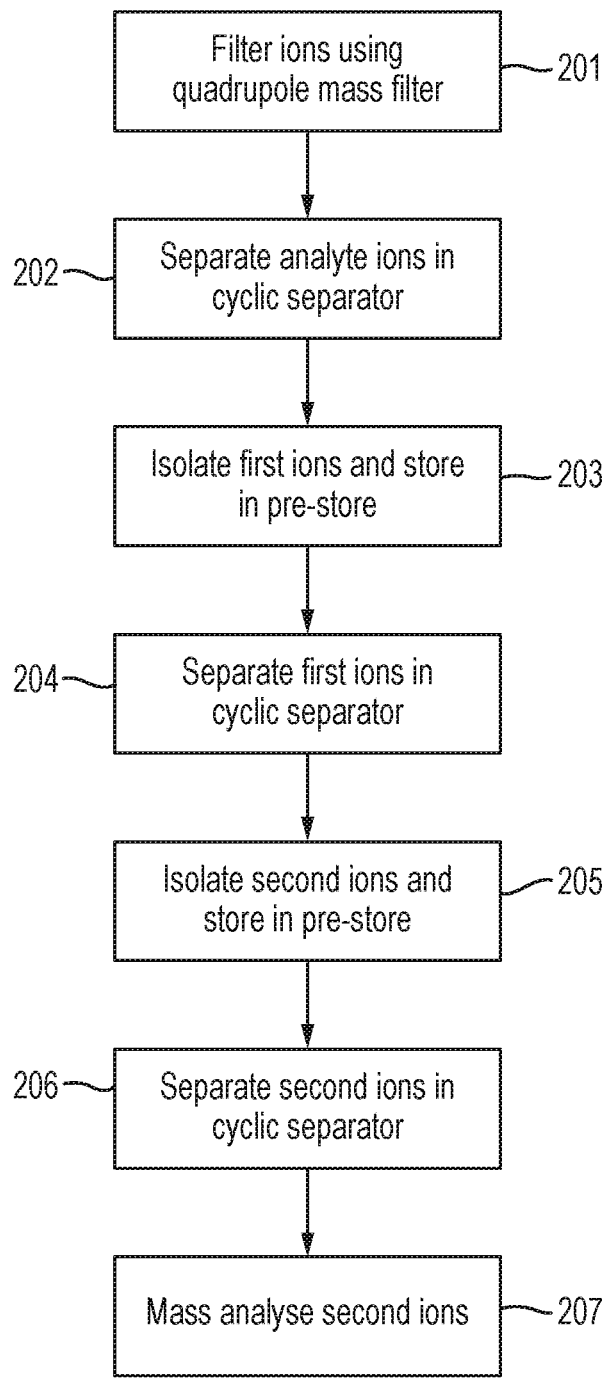
FIG. 20 shows a flow diagram in accordance with various embodiments.

FIG. 20 is a flow diagram summarising the technique according to various embodiments.

As described above, parent or precursor analyte ions produced by an ion source may be mass filtered by a mass filter such as a quadrupole mass filter (step 201).

The (filtered) analyte ions may be introduced into the ion mobility separator 300, whereupon the ions may be caused to separate according to their ion mobility, as they pass through the ion mobility separator 300 (step 202).

Ions may then be selected (isolated) ions and stored in the ion pre-store 200 (step 203). In other words, after separation (either single or multiple passes) a slice in drift time is taken from the ion of interest and ejected to the pre-array store.

Other non-selected ions may be discarded. Alternatively, these non-selected ions may be pass to the analyser 400 and analysed.

The selected (isolated) ions stored in the ion store 200 may then be reintroduced into the ion mobility separator 300, whereupon the ions may be caused to separate according to their ion mobility, as they pass through the ion mobility separator 300 (step 204).

Selected (isolated) ions may again be stored in the ion pre-store 200 (step 205). In other words, after further separation (either single or multiple passes) a second slice in drift time is taken from the ion of interest and ejected to the pre-array store.

Other non-selected ions may be discarded. Alternatively, these non-selected ions may be pass to the analyser 400 and analysed.

The selected (isolated) ions stored in the ion store 200 may then be reintroduced into the ion mobility separator 300, whereupon the ions may be caused to separate according to their ion mobility, as they pass through the ion mobility separator 300 (step 206).

The steps of separating and isolating ions may be performed one or more times, as desired. The effect of these multiple iterations of separation and selection will be to isolate a particular ion of interest with greater degree of purity. In other words, this process results in "enrichment" of the ion of interest with respect to other ions transmitted by the quadrupole in step 201.

Once the ions of interest have been sufficiently isolated from other ions in this manner, the ions of interest may be passed to the analyser 400 and may be analysed (step 207).

Alternatively, the ions may be introduced into an activation, collision, fragmentation or reaction device. The activation, collision, fragmentation or reaction device may be operated in an activation, fragmentation or reaction mode whereby ions are activated, fragmented or reacted to produce product ions.

These product ions may then be passed to the analyser 300 for analysis.

Ions within the mass analyser 300 may be separated according to their mass to charge ratio (time of flight).

Thus according to various embodiments, after selecting an ion of interest (together with other ions) using the quadrupole mass filter 100, one or more iterations of separation in a cyclic IMS device 300 are performed to further isolate the single ion of interest from the other ions. Each iteration may comprise separating the ions according to their ion mobility by passing the ions around the cyclic IMS device 300 one or more times. During each iteration, ions within a narrow window or range of ion mobility drift time are selected and moved into the pre-array store 200 of the cyclic IMS device, while the other ions are discarded.

Thus, various embodiments involve the following sequence of steps: (i) optionally select ions using the quadrupole 100; (ii) inject ions to cyclic IMS 300; (iii) separate; (iv) eject desired ions to pre-store 200; (v) eject undesired ions and acquire (or otherwise discard these ions via post-store); (vi) re-inject ions from pre-store 200; (vii) optionally repeat steps (iii) to (vi) one or more times; (viii) optionally separate; (ix) eject desired ions, optionally fragment and acquire.

As described above, in various embodiments ions corresponding to a target ion of interest are selected (that is, isolated from other ions) by: separating analyte ions according to their ion mobility, and isolating first ions of the (ion mobility separated) analyte ions within an ion mobility drift time range that corresponds to the target ion of interest, where the ion mobility drift time range has a width that is less than the width of an ion mobility peak that corresponds to the target ion of interest.

This may be achieved in a particular convenient and beneficial manner in accordance with the embodiments described above. However, various further embodiments are contemplated.

For example, WO 2013/140132 (Micromass) describes a method of improving the duty cycle and selectivity of tandem mass spectrometry (MS/MS) experiments by switching a mass filtering quadrupole to isolate one or more precursor ions within a single ion mobility separation (IMS) cycle time for an ion mobility-Quadrupole-Time-of-Flight (IMS-Q-ToF) geometry analytical instrument (such as the instrument illustrated by FIG. 3).

In the approach described in WO 2013/140132, the drift time region that is selectable is limited, at least in part, by the settling time of the (DC) voltages that are altered (switched) on the quadrupole mass filter so as to alter its set mass (transmission window). This can result a limited selectable drift time region, and regions where the quadrupole mass filter is transmitting a wide undesirable mass to charge ratio (m/z) range, particularly when switching from a low mass to charge ratio (m/z) precursor ion to a high mass to charge ratio (m/z) precursor ion. Various embodiments are directed to an approach whereby a temporal subsection of the ion mobility peak width is onwardly transmitted with mass to charge ratio (m/z) selection, thereby improving the selectivity over the approach described in WO 2013/140132.

Thus, according to various particular embodiments, the analytical instrument may comprise an ion mobility separator (IMS) upstream of a mass filter (for example as shown in FIG. 3). The mass filter may be configured to switch its (mass to charge ratio) transmission window (set mass) so as to isolate and transmit one or more different precursor ions, for example during an ion mobility separation (IMS) cycle of the ion mobility separator, at different ion mobility drift times.

The transmitted drift time window of selected precursor ions may be further reduced by gating. The transmission time may be less than the diffusion limited ion mobility peak widths, for example as described above.

Thus, various embodiments provide apparatus capable of switching rapidly to select subsections of ion mobility peaks, for example on sub-millisecond timescales, as well as preventing the transmission of undesirable precursor ions during the quadrupole switching step. This represents an improvement to the approach described in WO 2013/140132.

Figure 21:
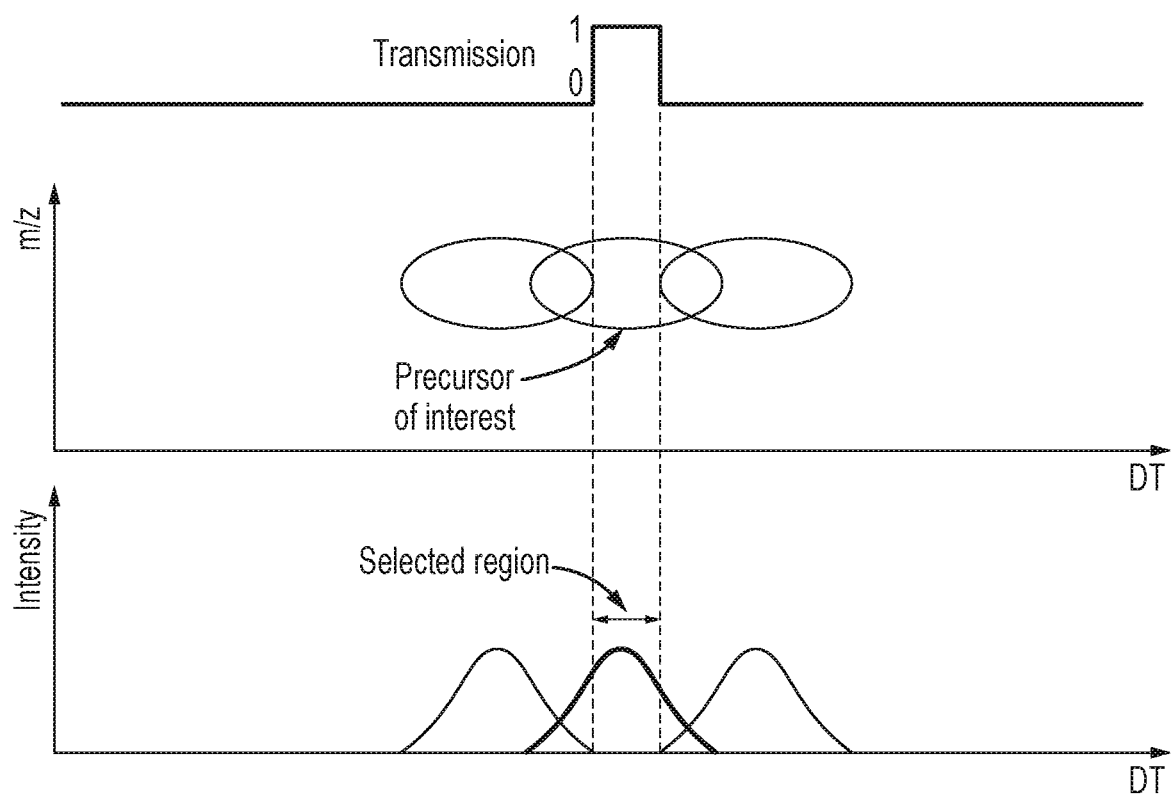
FIG. 21 illustrates a technique in accordance with various embodiments.

FIG. 21 illustrates the principle of operation and the benefits of the approach according to various embodiments. In FIG. 21, three precursor ions interfere in both drift time and mass to charge ratio (m/z) (in practice the precursor ions may not interfere in Time-of-Flight (ToF) measured mass to charge ratio (m/z), but may interfere in the sense that they are transmitted by the same quadrupole isolation window (this is sometimes known as "chimeracy").

As shown in FIG. 21, in accordance with various embodiments, ions may only be transmitted at times when the interfering precursors are not present (middle section of the peak in FIG. 21).

As can be seen from FIG. 21, the selection range has a width which is less than the width of the diffusion limited ion mobility peak that corresponds to the target ion of interest. This has the effect of increasing the "purity" of ions that are selected, and means for example, that relatively more of the desired ions are selected, as compared to undesired ions.

According to various particular embodiments, this approach may be implemented using the cyclic or closed-loop separator described above.

Various further embodiments involve altering (switching) one or more voltages (such as a resolving DC voltage) applied to a quadrupole pre-filter at multiple times (for example within the ion mobility separation cycle), so as to prevent onward transmission of precursor ions (that are not of interest) to a resolving quadrupole.

(In this regard, the quadrupole mass filter 100 may comprise a pre-filter quadrupole, an analytical quadrupole which may be arranged downstream of the first pre-filter quadrupole, and an optional post-filter quadrupole which may be arranged downstream of the first analytical quadrupole.

Each of the pre-filter quadrupole, the analytical quadrupole, and the post-filter quadrupole, may respectively comprise a set of four rod electrodes which may be arranged substantially parallel to and spaced apart from one another, for example substantially parallel to and spaced apart from a central axis of the quadrupole mass filter 100, for example substantially parallel to the direction in which ions travel in use. The pre-filter quadrupole, the analytical quadrupole, and the post-filter quadrupole may comprise respective segments of a segmented rod set.

The pre-filter quadrupole and (where present) the post-filter quadrupole may each have an axial length (in the direction parallel to the rods or the direction in which ions travel in use) that is much less than the axial length of the analytical quadrupole. Accordingly, the mass to charge ratio resolution of the pre-filter quadrupole and the post-filter quadrupole may be much less than the mass to charge ratio resolution of the analytical quadrupole.)

In these embodiments, as the transition time of ions through the pre-filter is significantly less than that of the analytical quadrupole, and as the precise value of the pre-filter resolving DC voltage is not critical for operation, it is possible to gate out relatively narrow drift time regions for mass to charge ratio (m/z) isolation within the quadrupole 100.

In these embodiments, it may also be necessary to alter (switch) the bias of the pre-filter to ensure unwanted ions have enough time to be ejected, and so that desired ions experience optimised transfer conditions.

Various other embodiments may include the addition of one or more specific gating electrodes, such as dynamic range enhancement (DRE) lens electrodes, Bradbury-Nielson (B-N) gates, post filters or gates. The gating electrode(s) may be operated so as to isolate ions within an ion mobility drift time range that corresponds to the target ion of interest, for example as described above.

Various other embodiments involve switching the (resolving DC) voltage(s) applied to the main analytical quadrupole between an "over resolved" zero transmission mode of operation, and a resolving mode of operation (in which ions having a particular mass to charge ratio (m/z) are transmitted). This may be done so as to isolate ions within an ion mobility drift time range that corresponds to the target ion of interest, for example as described above.

Other arrangements would be possible.

Any loss of sensitivity in various embodiments may be alleviated, for example, by retaining and recombining unselected ions, optionally before re-separation and re-selection. This approach can be enabled, for example, using the cyclic or closed-loop separator described above with appropriately timed orthogonal extraction.

It will be appreciated that various embodiments can improve the speed for ion mobility selection. Various embodiments may be used for transmission control in dynamic range enhancement (DRE) type experiments.

It will be appreciated from the above that various embodiments provide an improved method of mass and/or ion mobility spectrometry.

Although the present invention has been described with reference to preferred embodiments, it will be understood by those skilled in the art that various changes in form and detail may be made without departing from the scope of the invention as set forth in the accompanying claims.

The invention claimed is:

1. An analytical instrument comprising:
   a closed-loop ion mobility separator comprising a closed loop ion guide;
   one or more ion traps arranged upstream of the closed-loop ion mobility separator;
   an ion entry/exit device and;
   a control system, configured to cause ions corresponding to a target ion of interest to be selected by:
   causing the ion entry/exit device to inject analyte ions into the closed-loop ion mobility separator and causing the closed-loop ion mobility separator to separate the analyte ions according to their ion mobility;
   causing first ions, of the analyte ions, within a first ion mobility drift time range that corresponds to the target ion of interest to be isolated and causing the ion entry/exit device to eject the first ions to be stored in the one or more ion traps;
   causing the ion entry/exit device to inject the first ions into the closed-loop ion mobility separator and causing the closed-loop ion mobility separator to separate the first ions according to their ion mobility; and
   causing second ions, of the first ions, within a second ion mobility drift time range that corresponds to the target ion of interest to be isolated and causing the ion entry/exit device to eject the second ions to be stored in the one or more ion traps.

2. The analytical instrument of claim 1, wherein the first ion mobility drift time range has a width that is less than the width of an ion mobility peak that corresponds to the target ion of interest.

3. The analytical instrument of claim 1, wherein the second ion mobility drift time range has a width that is less than the width of an ion mobility peak that corresponds to the target ion of interest.

4. The analytical instrument of claim 1, further comprising a mass filter arranged upstream of or downstream of the closed-loop ion mobility separator.

5. The analytical instrument of claim 1, further comprising a fragmentation, activation or reaction device arranged downstream of the closed-loop ion mobility separator.

6. The analytical instrument of claim 1, further comprising an analyser arranged downstream of the closed-loop ion mobility separator.

7. A method of selecting ions, the method comprising selecting ions corresponding to a target ion of interest by:
   providing an analytical instrument as claimed in claim 1;
   separating analyte ions according to their ion mobility in the closed-loop ion mobility separator;
   isolating first ions of the analyte ions within a first ion mobility drift time range that corresponds to the target ion of interest;
   storing the first ions in the ion trap arranged upstream of the closed-loop ion mobility separator;
   separating the first ions according to their ion mobility in the closed-loop ion mobility separator; and
   isolating second ions of the first ions within a second ion mobility drift time range that corresponds to the target ion of interest; and
   storing the second ions in the ion trap.

8. The method of claim 7, wherein the first ion mobility drift time range has a width that is less than the width of an ion mobility peak that corresponds to the target ion of interest.

9. The method of claim 7, wherein the second ion mobility drift time range has a width that is less than the width of an ion mobility peak that corresponds to the target ion of interest.

10. The method of claim 7, further comprising:
    discarding analyte ions other than the first ions; and/or
    discarding first ions other than the second ions.

11. The method of claim 7, further comprising filtering the analyte ions according to their mass to charge ratio using a mass to charge ratio range that corresponds to the target ion of interest.

12. A method of mass and/or ion mobility spectrometry, the method comprising:
    selecting ions corresponding to a target ion of interest using the method of claim 7; and
    analysing the isolated ions and/or ions derived from the isolated ions.

13. The method of claim 12, further comprising activating, fragmenting or reacting the isolated ions to produce product ions, and analysing the product ions.

* * * * *